US007850775B2

United States Patent
Hollman et al.

(10) Patent No.: US 7,850,775 B2
(45) Date of Patent: Dec. 14, 2010

(54) MULTI-COLORED LUSTROUS PEARLESCENT PIGMENTS

(75) Inventors: Aaron M. Hollman, Union, KY (US); Stephane Nicolas, Fleurines (FR); Philippe Schottland, West Chester, OH (US); Marguerite Debacker, Court Saint Etienne (BE); Aurelie Antonowicz, Gembloux (BE); Hai Hui Lin, Mason, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 781 days.

(21) Appl. No.: 11/765,614

(22) Filed: Jun. 20, 2007

(65) Prior Publication Data

US 2008/0110371 A1   May 15, 2008
US 2009/0038514 A2   Feb. 12, 2009

Related U.S. Application Data

(60) Provisional application No. 60/865,042, filed on Nov. 9, 2006.

(51) Int. Cl.
| | |
|---|---|
| C09C 1/00 | (2006.01) |
| C09C 1/36 | (2006.01) |
| C09C 1/22 | (2006.01) |
| C04B 14/00 | (2006.01) |
| B32B 5/16 | (2006.01) |
| B32B 9/00 | (2006.01) |
| B32B 15/02 | (2006.01) |
| B32B 19/00 | (2006.01) |
| B32B 17/02 | (2006.01) |
| C09D 5/29 | (2006.01) |
| C08K 9/10 | (2006.01) |

(52) U.S. Cl. .................. 106/418; 106/31.65; 106/428; 106/438; 106/456; 106/459; 428/363; 428/402; 428/403; 428/404; 428/405; 523/171; 523/210; 523/212; 524/449

(58) Field of Classification Search ................ 106/418, 106/428, 438, 456, 459, 31.6, 31.65, 1.9, 106/439; 428/363, 336, 402–405, 432, 447, 428/697, 699, 701, 702; 424/64, 69, 70.7; 523/171, 210, 212; 524/449

See application file for complete search history.

(56) References Cited

U.S. PATENT DOCUMENTS

| | | | |
|---|---|---|---|
| 3,087,829 A | 4/1963 | Linton | |
| 3,874,890 A | 4/1975 | Bernhard et al. | |
| 3,926,659 A | 12/1975 | Bernhard et al. | |
| 3,931,025 A | 1/1976 | Woditsch et al. | |
| 4,146,403 A | 3/1979 | Armanini et al. | |
| 4,435,220 A | 3/1984 | Watanabe et al. | |
| 4,606,914 A | 8/1986 | Miyoshi | |
| 4,622,074 A | 11/1986 | Miyoshi et al. | |
| 4,701,221 A | 10/1987 | Brunn et al. | |
| 4,702,775 A | 10/1987 | Ostertag et al. | |
| 4,744,832 A | 5/1988 | Franz et al. | |
| 4,838,648 A | 6/1989 | Phillips et al. | |
| 4,867,793 A * | 9/1989 | Franz et al. ............... 106/415 |
| 4,948,631 A | 8/1990 | Ostertag et al. | |
| 4,976,787 A * | 12/1990 | Ito et al. ............... 106/441 |
| 5,009,711 A | 4/1991 | Emmert et al. | |
| 5,085,706 A | 2/1992 | Kuske et al. | |
| 5,164,005 A | 11/1992 | Kuske et al. | |
| 5,223,360 A | 6/1993 | Prengel et al. | |
| 5,273,576 A | 12/1993 | Sullivan et al. | |
| 5,277,711 A | 1/1994 | Schmidt et al. | |
| 5,326,392 A | 7/1994 | Miller et al. | |
| 5,356,471 A | 10/1994 | Reynders | |
| 5,364,467 A | 11/1994 | Schmid et al. | |
| 5,368,639 A | 11/1994 | Hasegawa et al. | |
| 5,374,306 A | 12/1994 | Schlegel et al. | |
| 5,449,403 A | 9/1995 | Andrean et al. | |
| 5,472,491 A | 12/1995 | Duschek et al. | |
| 5,486,354 A | 1/1996 | Defossez et al. | |
| 5,486,631 A | 1/1996 | Mitchnick et al. | |
| 5,571,851 A | 11/1996 | Freeman et al. | |
| 5,624,487 A | 4/1997 | Schmidt et al. | |

(Continued)

FOREIGN PATENT DOCUMENTS

| | | |
|---|---|---|
| DE | 22 15 191 | 10/1972 |
| DE | 31 51 354 | 7/1983 |
| DE | 32 35 017 | 3/1984 |
| DE | 33 34 598 | 4/1985 |
| DE | 40 30 727 | 4/1992 |
| DE | 197 46 263 | 4/1999 |
| EP | 0 090 259 | 10/1983 |
| EP | 0 290 908 | 11/1988 |
| EP | 0 632 109 | 1/1995 |
| EP | 0 634 459 | 1/1995 |

(Continued)

OTHER PUBLICATIONS

Buxbaum, G. et al., Industrial Inorganic Pigments, 3rd Ed. (2005) Weinheim: Wiley-VCG Verlag GmbH & Co. KgaA, pp. 7-50 & 195-273.

(Continued)

Primary Examiner—Anthony J Green
Assistant Examiner—Pegah Parvini
(74) Attorney, Agent, or Firm—Frost Brown Todd LLC

(57) ABSTRACT

A pearlescent pigment comprising a substrate and a first layer, wherein the first layer comprises iron oxide, wherein the iron has from about 1% to about 30% Fe(II) and from about 70% to about 99% Fe(III). A process for making these pearlescent pigment, comprise reducing a metal oxide substrate with a hydrogen source in the presence of a noble metal catalyst in a liquid medium. The pigments may be used in a variety of applications including cosmetics, plastics, automotive or architectural coatings.

37 Claims, 2 Drawing Sheets

U.S. PATENT DOCUMENTS

| | | | |
|---|---|---|---|
| 5,695,747 | A | 12/1997 | Forestier et al. |
| 5,718,754 | A | 2/1998 | Macpherson et al. |
| 5,733,658 | A | 3/1998 | Schmid et al. |
| 5,738,717 | A | 4/1998 | Oulsnam et al. |
| 5,753,371 | A | 5/1998 | Sullivan et al. |
| 5,759,255 | A * | 6/1998 | Venturini et al. ............ 106/418 |
| 5,932,197 | A | 8/1999 | Arnaud |
| 5,958,125 | A | 9/1999 | Schmid et al. |
| 5,958,197 | A | 9/1999 | Allen et al. |
| 6,019,831 | A | 2/2000 | Schmidt et al. |
| 6,086,846 | A | 7/2000 | Burow et al. |
| 6,132,873 | A | 10/2000 | Dietz et al. |
| 6,139,614 | A | 10/2000 | Schmid et al. |
| 6,190,445 | B1 | 2/2001 | Noguchi |
| 6,280,714 | B1 | 8/2001 | Arnaud et al. |
| 6,290,766 | B1 | 9/2001 | DeLuca, Jr. et al. |
| 6,372,517 | B1 | 4/2002 | Lange |
| 6,416,573 | B2 | 7/2002 | Horino et al. |
| 6,428,773 | B1 | 8/2002 | Oko et al. |
| 6,451,294 | B1 | 9/2002 | Simon |
| 6,485,556 | B1 | 11/2002 | DeLuca, Jr. |
| 6,488,758 | B2 | 12/2002 | Glausch et al. |
| 6,589,331 | B2 | 7/2003 | Ostertag et al. |
| 6,596,070 | B1 * | 7/2003 | Schmidt et al. ............ 106/417 |
| 6,616,745 | B1 | 9/2003 | Narvarti et al. |
| 6,620,233 | B1 | 9/2003 | Seeger et al. |
| 6,630,018 | B2 | 10/2003 | Bauer et al. |
| 6,632,275 | B1 | 10/2003 | Schoen et al. |
| 6,638,618 | B2 | 10/2003 | Hayashi et al. |
| 6,645,286 | B2 | 11/2003 | Ostertag et al. |
| 6,663,852 | B2 | 12/2003 | Simon |
| 6,689,205 | B1 | 2/2004 | Bruckner et al. |
| 6,689,206 | B2 | 2/2004 | Meisen |
| 6,692,561 | B1 | 2/2004 | Schoen et al. |
| 6,719,837 | B2 | 4/2004 | Bertaux et al. |
| 6,719,838 | B2 | 4/2004 | Heider et al. |
| 6,759,097 | B2 | 7/2004 | Phillips et al. |
| 6,773,499 | B2 | 8/2004 | Schoen et al. |
| 6,790,452 | B2 | 9/2004 | Kishida et al. |
| 6,818,299 | B2 | 11/2004 | Phillips et al. |
| 6,838,166 | B2 | 1/2005 | Phillips et al. |
| 6,875,264 | B2 | 4/2005 | Zimmermann et al. |
| 6,884,289 | B2 | 4/2005 | Schoen et al. |
| 6,902,609 | B2 | 6/2005 | Steffenino et al. |
| 6,902,807 | B1 | 6/2005 | Argoitia et al. |
| 7,014,700 | B2 | 3/2006 | DeLuca, Jr. et al. |
| 7,019,048 | B2 | 3/2006 | Brehm et al. |
| 7,122,245 | B2 | 10/2006 | Morton-Finger |
| 7,189,454 | B2 | 3/2007 | Johnson et al. |
| 7,226,503 | B2 | 6/2007 | Anselmann et al. |
| 7,235,127 | B2 | 6/2007 | Kunstmann et al. |
| 7,238,424 | B2 | 7/2007 | Raksha et al. |
| 7,241,503 | B2 | 7/2007 | Noguchi |
| 7,258,900 | B2 | 8/2007 | Raksha et al. |
| 7,303,622 | B2 | 12/2007 | Loch et al. |
| 7,318,861 | B2 | 1/2008 | Bagala, Sr. et al. |
| 7,678,449 | B2 | 3/2010 | Jones |
| 2002/0160194 | A1 | 10/2002 | Phillips et al. |
| 2003/0097965 | A1 | 5/2003 | Heider et al. |
| 2003/0177950 | A1 | 9/2003 | Schoen et al. |
| 2005/0142084 | A1 | 6/2005 | Ganguly et al. |
| 2005/0154082 | A1 | 7/2005 | DeLuca, Jr. et al. |
| 2005/0186423 | A1 | 8/2005 | Johnson et al. |
| 2006/0070552 | A1 | 4/2006 | Loch et al. |
| 2006/0223910 | A1 | 10/2006 | Bagala, Sr. |
| 2007/0026229 | A1 | 2/2007 | Johnson et al. |
| 2007/0028799 | A1 | 2/2007 | Kniess et al. |
| 2007/0034112 | A1 | 2/2007 | Mronga et al. |
| 2008/0124575 | A1 | 5/2008 | Hollman et al. |
| 2008/0170830 | A1 | 7/2008 | Guan et al. |

FOREIGN PATENT DOCUMENTS

| | | |
|---|---|---|
| EP | 0 649 886 | 4/1995 |
| EP | 0 913 431 | 5/1999 |
| EP | 1 666 541 | 6/2006 |
| JP | 58 164653 | 9/1983 |
| JP | 07-330948 | 12/1995 |
| WO | WO 96/32446 | 10/1996 |
| WO | WO 97/29059 | 8/1997 |
| WO | WO 99/57204 | 11/1999 |
| WO | WO 01/92425 | 12/2001 |
| WO | WO 2008/077487 | 7/2008 |
| WO | WO 2008/156948 | 12/2008 |

OTHER PUBLICATIONS

International Search Report dated Sep. 10, 2009 for Application No. PCT/US08/087640.

Li, Y. et al., "Hydrothermal Synthesis of Ultrafine α-$Fe_2O_3$ and $Fe_3O_4$ Powders," Material s Research Bulletin, vol. 33(6) (Jun. 1, 1998) pp. 841-844.

Miyoshi, T. et al., "Overall Review of Surface Modification Technology," PCI Asia (2000) pp. 1-7.

Office Action dated Nov. 14, 2008 for U.S. Appl. No. 12/016,341.

Office Action dated May 11, 2009 for U.S. Appl. No. 12/016,341.

Office Action dated Nov. 19, 2009 for U.S. Appl. No. 12/106,341.

Junru et al.: The preparation and characteristics of a multi-cover-layer type, blue mica titania, pearlescent pigment. Dyes and Pigments 56 (2003) 93-98.

Stengl et al.: The preparation and characteristics of pigments based on mica coated with metal oxides. Dyes and Pigments 58 (2003) 239-244.

Subrt et al.: Uniform particles with a large surface area formed by hydrolysis of $Fe_2(SO_4)_3$ with urea. Materials Research Bulletin, (1999) vol. 34, No. 6, 905-914.

Tan et al.: Preparation and conductive mechanism of mica titania conductive pigment. Dyes and Pigments 62 (2004) 107-114.

Abstract for DE 2215 191, also published as GB1348878, [Oct. 1972].

Abstract for DE 31 51 354, also published as US 4,494,993, [Jul. 1983].

Abstract for DE 3235 017, also published as US 4,482,389, [Mar. 1984].

Abstract for DE 33 34 598, also published as US 4,544,415, [Apr. 1985].

Abstract for DE 40 30 727, [Apr. 1992].

Abstract for EP 0 090 259, also published as US 4,490,179, [Oct. 1983].

Abstract for EP 0 632 109, [Jan. 1995].

Abstract for JP 58 164653, [Sep. 1983].

Harding, P.H., J. of Adhesion Science Technology, vol. 11(4) p. 471-493.

Ponjee, J.J., Philips Technical Review, vol. 44(3) p. 81.

International Search Report dated Sep. 10, 2009 for Application No. PCT/US2008/064243.

Written Opinion dated Sep. 10, 2009 for Application No. PCT/US2008/064243.

* cited by examiner

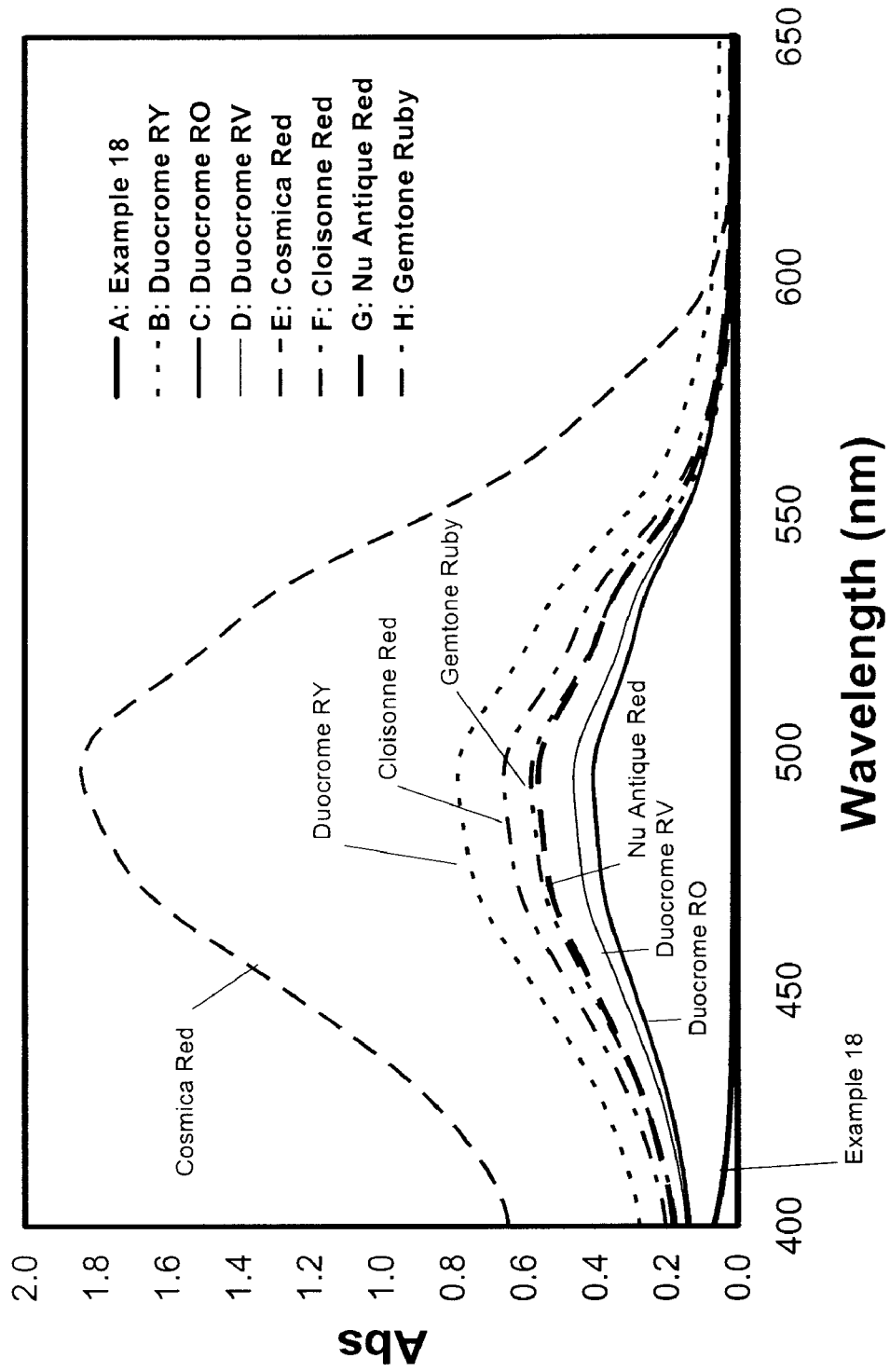
Figure 2. Absorbance measurements of the filtrate solution for each red pearlescent pigment analyzed for acid resistance.

US 7,850,775 B2

MULTI-COLORED LUSTROUS PEARLESCENT PIGMENTS

CROSS REFERENCE TO RELATED APPLICATIONS

The present application hereby claims the benefit of the provisional patent application Ser. No. 60/865,042, filed on Nov. 9, 2006, the disclosure of which is hereby incorporated by reference in its entirety.

BACKGROUND OF THE INVENTION

The present invention relates, in general, to multi-colored lustrous pearlescent pigments.

Along with gem stones (e.g., diamond, ruby, emerald, topaz, opal, jade), and precious metals (e.g., gold, silver, platinum), pearls are among the most prized possessions (or luxury items) for human beings for millenniums. Beside their natural beauty, the brilliant color and luster, they are often associated with social status and level of well-being. As a result, and not surprisingly, the trend of cosmetics makeup is to emulate or recreate these "natural" and "aesthetic" appearances of pearl, gem and precious metals with less expensive materials such as interference pigments (e.g., metal oxide coated mica). The most common types of pearlescent pigments are metallic flakes, micronized titanium dioxide, metal oxide coated mica, metal oxide coated alumina, metal oxide coated silica, basic lead carbonate, bismuth oxychloride, and natural fish silver.

Metal oxide coated mica pigments are characterized by excellent optical, chemical, mechanical, toxicological, and environmental properties. Natural or synthetic mica, and alternative supports, such as aluminum flakes, or $SiO_2$ platelets, can be used alone, or as a support for titanium dioxide, iron oxide ($Fe_2O_3$ or $Fe_3O_4$), iron ferrocyamide (Iron Blue or Prussian Blue), tin oxide, and chromium oxide. The color space defined by these coated mica-based pigments is based on the type of coating (e.g. metal oxide, colorant, etc.) used, the layer thickness, and the number of coated layers.

Among the natural pearls, the most expensive are black pearls, which come with various undertone and color flops. To faithfully emulate this aesthetic optical effect in cosmetic makeup is one of the top challenges facing a cosmetic pigment maker and formulator. The traditional approach to these pigments is to blend dark solid-color inorganic pigment (e.g., carbon black) with white platy pearlescent pigments (e.g., $TiO_2$ coated mica, $TiO_2$ coated borosilicate, $TiO_2$ coated alumina). The platy interference pigment provides the luster, brilliance (reflection), transparency and depth of field. The solid-color pigment(s) provide(s) the dark undertone and surface coverage. However, this type of blend usually appears to be much "dirtier", "lack luster", and "lack transparency" compared to the natural pearl. The primary reason for that is fouling of the smooth surface of white pearlescent pigment by the solid-color pigment granules, which leads to light scattering and disruption of light interference.

A need exists to expand the existing color space of metal oxide coated mica-based pigments to more vibrant, lustrous colored shades, as well as, antique dark pearlescent shades, using a processing method that allows for optimal control of color and opacity.

BRIEF SUMMARY OF THE INVENTION

The invention overcomes the above-noted and other deficiencies of the prior art by providing a pearlescent pigment comprising a substrate and a first layer, wherein the first layer comprises iron oxide, wherein the iron in the iron oxide comprises from about 10% to about 20% Fe(II), and from about 80% to about 90% Fe(III).

Another aspect of the invention is a pearlescent pigment, wherein the pigment is prepared by coating a substrate with a metal oxide to from a first layer, and reducing the metal oxide of the first layer, wherein only about 10% to about 20% of the metal is reduced.

Another aspect of the invention is a process for reducing a metal oxide coated substrate with a hydrogen source in the presence of a noble metal catalyst.

Another aspect of the invention is a highly active catalyst, comprising a nanoparticulate noble metal in a polyvinylpyrrolidone (PVP) polymer, or other polymer.

Another aspect of the invention is a cosmetic formulation comprising a pearlescent pigment comprising a substrate and a first layer, wherein the first layer comprises iron oxide, wherein the iron in the iron oxide comprises from about 10% to about 20% Fe(II), and from about 80% to about 90% Fe(III).

These and other objects and advantages of the present invention shall be made apparent from the accompanying drawings and the description thereof.

BRIEF DESCRIPTION OF THE FIGURES

FIG. 2 is the visible spectra of the filtrates of the pigments tested in Example 18

DETAILED DESCRIPTION OF THE INVENTION

Figure 1:
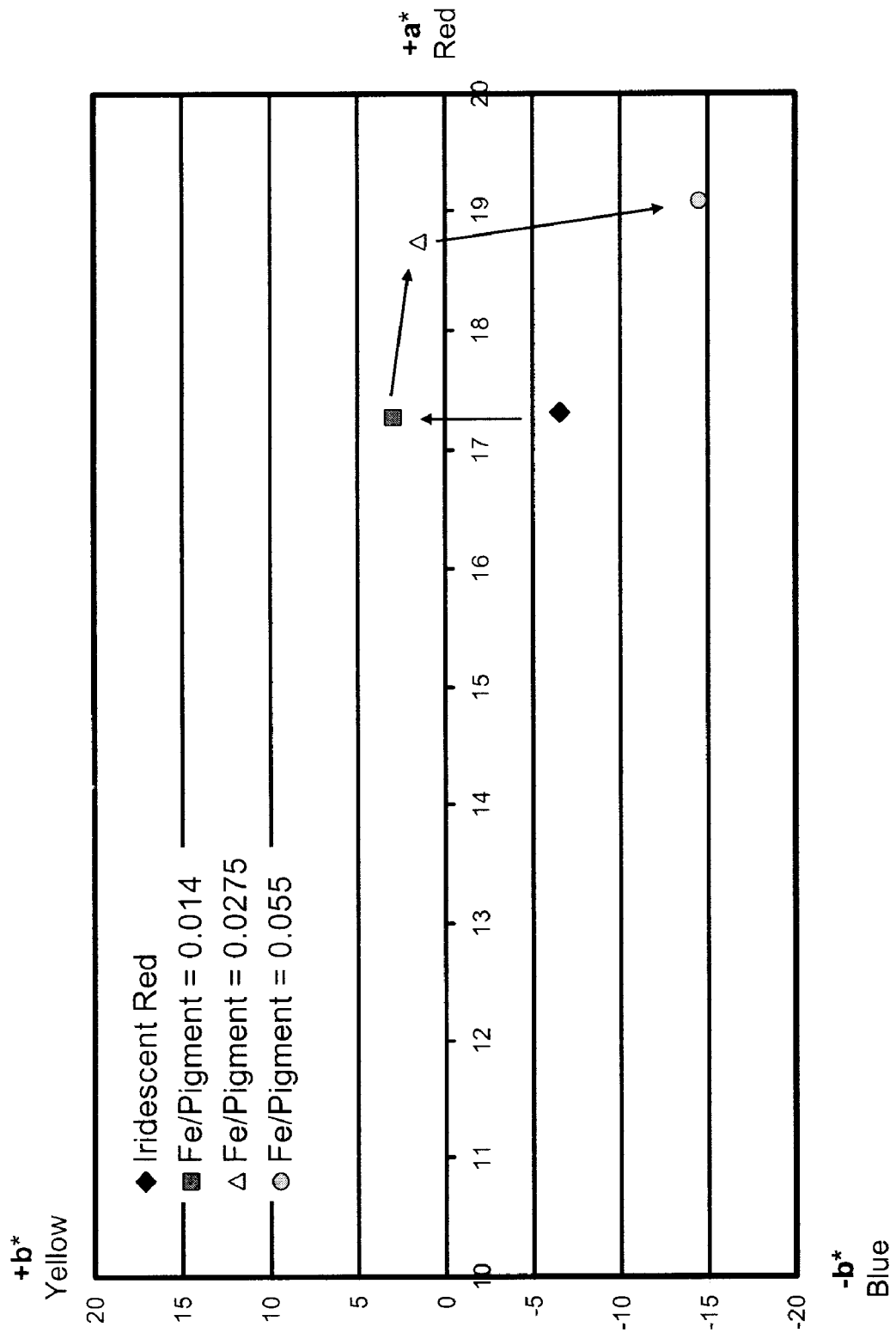
FIG. 1 is a graph of the CIELAB a* and b* color coordinates of Examples 14-16 as measured against a black background.

The present invention relates to lustrous, pearlescent pigments with controlled opacity, comprising a substrate and a first layer, wherein the first layer comprises iron oxide, wherein the iron in the iron oxide comprises from about 10% to about 30% Fe(II) and from about 70% to about 99% Fe(III).

Iron oxide coated substrates exhibit intensely colored pearlescent pigments with high luster. Varying the substrate, the iron oxide layer thickness, and the amount of Fe(II) and Fe(III) in the layer will change the color, luminosity, and transparency of the pigment. The mean thickness of the first layer may be from about 1 nm to about 350 nm, or from about 10 nm to about 250 nm.

In one embodiment, the pigment may comprise a second layer located between the substrate and the first layer, wherein the second layer comprises an oxide selected from the group consisting of $TiO_2$, $Fe_2O_3$, $ZrO_2$, $SnO_2$, $Cr_2O_3$, $BiOCl$, and $ZnO$. The second layer may be $TiO_2$. The second layer may be an iron oxide, such as $Fe_2O_3$, $Fe_3O_4$, $FeOOH$, $FeO$, and $Fe(OH)_3$. The mean thickness of the second layer may be from about 50 nm to about 800 nm, or from about 100 nm to about 600 nm.

In another embodiment, titanium oxide coated mica pigments exhibit pearlescent effects resulting from reflection and light interference. The interference color and luster is dependent on the thickness of the $TiO_2$ surface layer and its corresponding surface roughness. This initial interference color of the pigment, prior to the coating of the first layer is apparent when viewed against a black background. It has been surprisingly discovered that FeOOH deposition followed by reduction results in the advancement of the interference color and a significant increase in opacity of $TiO_2$ coated platelet-like pigments. This process transforms the transparent, $TiO_2$ coated mica, into a lustrous colored pearlescent pigment with increased opacity. The thickness of the deposited FeOOH layer controls the magnitude of the color progression and opacity. For relatively thick FeOOH layers, the interference color progresses to the next shade and the pigment approaches complete opacity.

Another embodiment is a pearlescent pigment, wherein the pigment is prepared by coating a substrate with a metal oxide to form a first layer, and reducing the metal oxide of the first layer, wherein only about 10% to about 20% of the metal is reduced. The substrate may be selected from the group consisting of natural mica, synthetic mica, glass flakes, $Al_2O_3$ platelets, $SiO_2$ platelets, and BiOCl. The pearlescent pigment may additionally comprises a second layer located between the substrate and the first layer, wherein the second layer comprises an oxide selected from the group consisting of $TiO_2$, $Fe_2O_3$, $ZrO_2$, $SnO_2$, $Cr_2O_3$, BiOCl, and ZnO. The pearlescent pigment may comprise a mixture of different substrates. Furthermore, the substrate may be made of identical or different flakes which differ in particle size.

In order to increase the light, water and weather stability, it is frequently advisable to subject the finished pigment to post-coating or post-treatment, depending on the area of application. Examples of post-coatings or post-treatments are the processes described in German Patent 22 15 191, DE-A 31 51 354, DE-A 32 35 017, DE-A 33 34 598, DE 40 30 727 A1, EP 0 649 886 A2, WO 97/29059, WO 99/57204, U.S. Pat. No. 5,759,255. This post-coating may further increase the chemical stability or simplify handling of the pigment, in particular incorporation into various media. In order to improve the wettability, dispersibility and/or compatibility with the user media, functional coatings of $Al_2O_3$ or $ZrO_2$ or mixtures thereof may be applied to the pigment surface. Also possible are organic post-coatings, for example with silanes, as described, for example, in EP 0090259, EP 0 634 459, WO 99/57204, WO 96/32446, WO 99/57204, U.S. Pat. Nos. 5,759,255, 5,571,851, WO 01/92425 or in J. J. Ponjee, Philips Technical Review, Vol. 44, No. 3, 81 ff. and P. H. Harding J. C. Berg, J. Adhesion Sci. Technol. Vol. 11 No. 4, pp. 471-493.

In one embodiment, organofunctnal coupling agents may form an outer layer on the pearlescent pigment. Suitable organofunctional coupling agents are the coupling agents disclosed in EP 632 109 B1. Examples include, silanes, zirconium aluminates, zirconates, and titanates. The silanes may possess the structure $Y-(CH_2)_n-SiX_3$ in which n is 2-8, Y is an organofunctional group, e.g. an amino, methacrylic, vinyl, alkyl, aryl, halogen and/or epoxy group, and X is a silicon-functional group which following its hydrolysis reacts with active sites of an inorganic substrate or by condensation with other silicon compounds. This group Y may comprise, for example a hydroxy, a halogen or an alkoxy group.

In addition to these substantially hydrophilic coupling agents, it is also possible to use hydrophilic silanes, especially the aryl-, alkyl- and fluoroalkyl-substituted di- and trimethoxysilanes. These include, for example, phenethyltriinethoxysilane, propyltrimethoxysilane, butyltrimethoxysilane, isobutyltrimethoxysilane, hexyltrimethoxysilane, octyltrimethoxysilane, 1H, 1H, 2H, 2H-perfluorodecyltrimethoxysilane and (3,3,3-trifluoropropyl)methyldimethoxysilane. The concentration of coupling agents may be 0.2-1.2% by weight with respect to the base pigment.

In one embodiment, the substrate is platelet-like and may have a mean thickness of about 0.05 to about 1.5 μm and a mean width of about 1 to about 750 μm. The substrate may have a mean width of about 10 to about 60 μm, about 5 to about 25 μm, about 10 to about 100 μm, about 40 to about 250 μm, or about 95 to about 730 μm.

As an example, at relatively low FeOOH coating on an iridescent blue $TiO_2$ coated laminar substrate (such as SunPearl Iridescent Blue by SunChemical), a semi-opaque lustrous blue-green or turquoise pearlescent pigment will result upon hydrogenation (see Example 26). However, using this same iridescent blue substrate at higher FeOOH loading, a lustrous green or olive pearlescent shade with increased opacity will result using similar conditions for hydrogenation (see Example 27). This color advancement trend is applicable to many shades of $TiO_2$ coated laminar substrates. Therefore, more opaque blue pearlescent shades may be produced by reduction of iridescent violet $TiO_2$ coated substrates (such as SunPearl Iridescent Violet by SunChemical) containing thick FeOOH coatings (see Example 23). Likewise, less opaque green shades may be produced by reduction of iridescent green $TiO_2$ coated substrates (such as SunPearl Iridescent Green by SunChemical) having relatively thin FeOOH surface layers (see Example 8).

The synthesis of a particular colored pearlescent pigment begins with selection of the proper substrate material. The substrate may be comprised of natural mica, synthetic mica, glass flakes, $Al_2O_3$ platelets, $SiO_2$ platelets, BiOCl, borosilicate, and synthetic alumina. Such substrates may be multi-layer materials, i.e. include materials of different refractive indices. The substrate may comprise mica.

The first step in forming a colored pearlescent pigment is to coat the substrate, or metal oxide coated substrate with a layer of non-annealed FeOOH, which is usually pale yellow in color. For the reasons of decreased crystallinity and higher surface area (porous microstructure), non-annealed FeOOH may be reduced to an iron oxide (FeO, FeO—$Fe_2O_3$, $Fe_3O_4$) under more mild reaction conditions, as compared to the more crystalline $Fe_2O_3$. The methods of deposition (or precipitation) of FeOOH or $Fe(OH)_3$ onto substrates are well known in the literature, for example as shown in *Dyes and Pigments*, 58 (2003), 239-244, U.S. Pat. No. 3,926,659, and in many scientific papers and patents particularly by Merck, Engelhard, and BASF. It is possible to start from a pre-coated substrate and coat this substrate with a metal oxide. Alternatively, the process may start from the substrate itself and a single coating may be used to reach the correct amount of iron oxide.

The basic principle of deposition is as follows: $Fe^{3+}$ precursors such as ferric chloride, ferric sulfate, or both, are dissolved in an acidic medium containing the substrate. As the pH is increased by the addition of bases such KOH, NaOH, LiOH, and ammonia; $Fe^{3+}$ ions are precipitated out as either colloidal FeOOH particles, or dense aggregates depending on the pH control profile, temperature and concentration, and in some case the presence of electrical field. In the presence of substrates with affinity to FeOOH, the colloidal particles can quickly form a uniform film on the substrate. The bonding between the deposited layer and substrate is usually a combination of metal oxide covalent bonds and hydrogen bonds. For example, in the case of making an antique burgundy pearlescent pigment, the substrate is hematite (red calcined $Fe_2O_3$) coated mica, which has extremely good affinity to FeOOH.

The traditional precipitation process utilizing KOH and NaOH is called a heterogeneous hydrolysis process. However, more recently, a newer process called homogenous hydrolysis, utilizes urea as an in situ generated base. This process is said to produce a smoother and more transparent metal oxide film as shown in *Dyes and Pigments* 58 (2003) 239-244, and *Materials Research Bulletin* (1999), vol. 34, no. 6, 905-914. The use of ferric sulfate may produce coarser particles, and weaker luster than ferric chloride. A computer-programmed rate-control heater may be used to better control the decomposition rate of urea, which in turn controls the rate of ammonia (base) generation. When the base generation rate is zero order (i.e., constant), the FeOOH colloids will nucleate and grow at a constant rate, and precipitate onto the substrate at a constant rate as well. As a result, a highly uniform film can be generated. At 80° C.-90° C., the urea hydrolysis is nearly zero order. This temperature range may be useful as the plateau (holding) temperature of the process. The amount of urea used is just enough to bring the final hydrolyzed solution pH to be between 6 and 8, in order to minimize the amount of free $Fe^{3+}$ precursor left in the solution. $Fe^{3+}$ is known to be at its lowest solubility around pH 8.

Depositing FeOOH by the Fe(III)-urea homogeneous hydrolysis may lead to uniform layers of FeOOH on the surface of the titanium dioxide coated mica substrates, which results in neon shaded pearlescent pigments (neon green-gold, neon pink, neon silver gold, etc.) that are not currently available commercially.

After deposition of a thin layer of FeOOH onto the colored substrate, the pigments are recovered from the solution by filtration. The pigments are washed multiple times with deionized water to remove residual urea, followed by drying to remove residual moisture. Following sufficient drying, the dry pigments are ready for reduction. Hydrogenation may be used to reduce the FeOOH layer. The resultant iron oxide (FeO, FeO—$Fe_2O_3$, $Fe_3O_4$) layer is typically darker in color, depending on the degree of reduction, thickness of the layer, and any other layers. Generally speaking, the more aggressive the hydrogenation conditions or the thicker the layer, the darker the final pigment will be. However, an overly thick iron oxide (FeO, FeO—$Fe_2O_3$, $Fe_3O_4$) layer will lead to some loss of transparency and luster. The reduction is performed so that the iron of the iron oxide typically comprises from about 1% to about 30% Fe(II) and from about 70% to about 99% Fe(III). The reduction may be performed so that the iron of the iron oxide comprises from about 12% to about 18% Fe(II) and from about 82% to about 88% Fe(III). The reduction may be performed so that the iron of the iron oxide comprises from about 14% to about 16% Fe(II) and from about 84% to about 86% Fe(III). In one embodiment, the amount of iron, in the iron oxide, is about 1% to about 15% of the weight of the pearlescent pigment.

Homogeneous hydrogenation of suspensions containing FeOOH coated mica-based pigments allows much greater control of the oxidation state of the deposited iron oxide layers, compared to conventional high temperature calcination in a reducing ($H_2/N_2$) atmosphere. Thus, this processing technique may allow more precise control over pigment color and luster. In addition, the two step process of Fe(III) deposition followed by liquid phase hydrogenation may yield pearlescent pigments with a smooth texture and improved rub-resistance relative to existing methodologies (e.g. mixtures, etc.).

One method of reduction uses a liquid-phase hydrogenation set-up consisting of three main components: 1) the hydrogen reservoir (equipped with $N_2$ purging); 2) a pressurized reaction chamber (with a 45° pitch agitation blade and an electrical heating mantle); and 3) a blow-out collector reservoir in case of over-pressure situation. The system is fully enclosed to minimize the risk of gas explosion. The pigments are first dispersed in a non-oxidizing (or mildly reductive) liquid, which has a reasonable $H_2$ gas solubility. Generally speaking, the higher the gas pressure, the higher the $H_2$ concentration in the carrying medium, and therefore the faster the reduction reaction. Higher temperatures and the addition of a noble metal catalyst also speed up the reaction. The degree of reduction, or the lightness (or darkness) of the final pigment are most effectively controlled by the length of reduction time and catalyst loading.

Some examples of solvents are PEG 400 (polyethylene glycol of molecular weight 425 g/mol) and NMP (N-methylpyrrolidone). Other solvents or liquids such as ethylene glycol, PEG 200, dimethylformamide and water can also be used. PEG 400 is most favored due to its high chemical stability (i.e., reusable for many runs), high boiling point (i.e., enabling high temperature reduction), low vapor pressure, low flammability, high $H_2$ solubility, good wetting power to the pigment (i.e., excellent dispersion and maximum surface exposure to $H_2$), good wetting power to the catalyst (i.e., maximize catalytic surface), and moderate viscosity (45 cP) for the ease of processing, which should be high enough to keep mica pigments from settling even under gentle agitation, and low enough to be filtered out under mild vacuum filtration condition. NMP may also be used. In the current process, the hydrogenation pressure is set to 10-25 bar, and temperature is set at 200-220° C., below the degradation temperature of the solvents. The agitation is usually kept below about 300 RPM to avoid fragmenting the pigment. The mica based pigments are usually very fragile and can break under high shear. Fragmentation usually leads to the rise of opacity and loss of luster. The concentration of the catalyst may be about 0.001 to about 0.2 g of catalyst per kilogram of liquid medium. In one embodiment the concentration of the catalyst may be about 0.01 to about 0.08 g of catalyst per kilogram of liquid medium.

Examples of noble metal catalysts include, but are not limited to Pd, Pt, $PtO_2$ (Adam's catalyst), Rh, Au, Ag, and Ta. The catalyst may be oxides, hydroxides or other derivatives of noble metals. The catalyst can come in supported or unsupported forms. Examples of supported forms include, but are not limited to Pd and Pt metals deposited onto charcoal or carbon based supports (coconut shell, etc.), alumina, zeolite or other inorganic substrates (support). The size of support can range from several millimeters to as small as 10-20 microns. Due to the higher surface to volume ratio, catalysts on smaller support can have a higher metal loading and thus higher catalytic activity. However, due to the size and density similarity to interference pigments, (i.e., 25-75 micron, SG of 3-5), catalysts of small support can be difficult to separate from the pigment, recover and reuse. The use of supported catalysts the size of about 1 mm and above, can be easily separated from pearlescent pigments by dry sieving using sieves of 80-120 mesh size. The large-support catalysts, including but not limited to Escat® 3 mm (Pt on alumina) are easily separated; they have relative low efficiency, and thus are useful for shallower hydrogenation that produces lighter color antique pearls such as antique copper and antique bronze.

Nanoparticulate metal catalysts are useful for deep hydrogenation to obtain extremely dark color. In one embodiment, commercially obtained bulk $PtO_2$ powder (usually 10-50 micron diameter) is wet milled with PEG400 in an intensive media mill using 0.5 mm zirconia media for 8 to 16 hours. The final particle size is submicron (ie., colloidal size), and the $PtO_2$ can suspend in PEG 400 liquid for a couple days without settling. Since the majority of the interference pigment will settle in PEG 400 within an hour or so, sedimentation may be used as a separation process to recover colloidal $PtO_2$ from the pigment slurry. The majority of colloidal $PtO_2$ will remain in supernatant phase to be decanted and reused. Such method provides for an efficient liquid-phase hydrogenation of metal oxide coated mica pigments.

A colloidal fluid of stabilized metal nanoparticles, such as Pt nanoparticles (Pt-NP) may be used as the catalyst for hydrogenation. Pt-NP catalytic fluid is prepared by a polymer stabilized direct-reduction method. The Pt nanoparticles are of 2-5 nm in size, and are stabilized by polyvinylpyrrolidone (PVP) polymer. This embodiment offers several benefits over micronized $PtO_2$ catalyst and industrially available hydrogenation catalysts mentioned above. First, it is thought that the extremely large surface area of Pt colloid allows for the use of less catalyst, and much more intimate contact between the catalyst and the substrate. Secondly, a small particle size and the presence of a lubricating polymer (PVP), help reduce the friction between the substrate and catalyst, which may lead to better preservation of surface smoothness and luster of the pigment. Third, this catalytic fluid is thermodynamically stable. The long shelf-life is a big advantage over the micronized $PtO_2$ catalyst, which requires periodically re-milling to sustain catalytic efficiency.

After hydrogenation, the pigment is subjected to an optional washing step to remove the Pt residue. PVP, a known chelating agent to Pt and a reducing agent to platinum salt, is useful as a 10% PVP aqueous washing solution to remove the free Pt-NP in the supernatant, Pt-NP absorbed onto substrate and any trace of Pt ions that might be present.

The deposition of FeOOH followed by hydrogenation may be utilized to progress the interference color associated with pearlescent, $TiO_2$ coated, mica-based pigments. Transparent, pearlescent $TiO_2$ coated pigments may be transformed into lustrous colored pearlescent pigments using the described methodology. For relatively thin FeOOH deposition, hydrogenation results in pigments characterized by the same interference color with increased opacity. The interference color may be progressed to the next shade (for instance, from violet to blue or blue to green) through reduction of relatively thick FeOOH coatings. This process also significantly increases the opacity of the resulting pearlescent pigment. Thus, various vibrant, multi-colored pigments may be produced in all four quadrants of the CIELab color space with controlled opacity allowing for significantly improved formulation flexibility.

In one embodiment of a black/antique pearlescent pigment, the synthesis starts with choosing an appropriate substrate. The choice of substrate affects the undertone and transparency of color of the black/antique pearl interference pigment. For example, to yield an antique burgundy look, it is important to choose a substrate with deep red or deep maroon color, such as hematite (i.e., high temperature calcined $Fe_2O_3$) coated mica. This undertone in combination with an iron oxide (FeO, FeO—$Fe_2O_3$, $Fe_3O_4$) top layer will produce various shades of burgundy colors. $Fe_2O_3$ or $TiO_2$ coated synthetic or natural mica has colors ranging from red to yellow and blue to green. The color of substrate dictates the undertone of final pearl appearance. It is also desirable to choose a substrate with high transparency so that it can faithfully emulate the "airy" look of high quality natural pearl. Generally speaking synthetic mica (such those made by CQV), glass flakes layer (for instance from Nippon Sheet glass), borosilicate and synthetic alumina substrates are preferred over natural mica for higher transparency. Such substrates may be multilayer materials i.e. include materials of different refractive indices.

In one embodiment the pearlescent pigment is blue, with a CIELAB hue angle, $h_{ab}$, from about 170 to about 275 degrees, measured over a white background using a D65 illuminant and a 10 degree observer. Blue pearlescent pigments may be produced that do not contain iron blue (ferric ferrocyamide), allowing the pigment to be used in cosmetic applications involving the lip area, such as lip gloss, lipstick, and other lip formulations. In addition, the blue pearlescent pigments are more stable than ferric ferrocyamide, which decomposes in alkaline pH resulting in pigment bleeding and marked changes in pigment color. Another advantage of the blue pearlescent pigments is that they do not restrict the pigment to the color space defined by ferric ferrocyamide. Iron Blue is a powerful colorant that only allows the pigment designer to formulate pigments within a well defined, narrow color space and restricts formulation flexibility, see *Dyes and Pigments* 56 (2003) 93-98.

In one embodiment the pearlescent pigment is green, with a CIELAB hue angle, $h_{ab}$, from about 80 to about 170 degrees, measured over a white background using a D65 illuminant and a 10 degree observer. Green pearlescent pigments may be produced that do not contain chromium oxide, allowing the pigment to be used in cosmetic applications involving the lip area, such as lip gloss, lipstick, and other lip formulations. Most commercially available green pearlescent pigments are based on chromium oxide deposition, U.S. Pat. No. 6,485,556.

In one embodiment the pearlescent pigment is red, pink, or violet, with a CIFLAB hue angle, $h_{ab}$, from not less than about 275 to not more than about 50 degrees, measured over a white background using a D65 illuminant and a 10 degree observer. Red mica-based pearlescent pigments may be produced that do not contain carmine. Carmine is a colorant used extensively in the cosmetic industry (such as Cloisonné® Red by Engelhard/BASF). It is extremely sensitive to UV exposure and may fade over time. Carmine is also unstable in acidic environments. It is often characterized by colorant bleeding in cosmetic formulations, such as nail polish. In addition, carmine has been linked to numerous reports of allergic reactions, including anaphylaxis. The development of carmine-free red, pink and violet shades is particularly advantageous because it offers formulators a more stable and hygienic alternative. In one embodiment the pearlescent pigment does not contain carmine. In another embodiment, the pearlescent pigment has a HPI of less than about 1 when measured in a 76 µm thick film formed from 10 wt % of the pigment in acrylic enamel. The HPI may be less than about 0.5. The HPI may range from about 0.05 to about 0.5.

There are relatively few dark colored (or antique-looking) pearlescent pigments currently offered in the market, examples of such are: Timica® and Cloisonné Nu-Antique® lines by Engelhard/BASF. The existing dark pearlescent products in the market are too opaque and too dull (i.e., not enough luster), and not dark enough to emulate the natural black pearl effect (e.g., Tahiti black pearl). In addition, they exhibit an undesirable darkening effect when applied and rubbed on the skin. One method to solve these problems is to use a dark colored layer on top or beneath the interference layer as a smooth film, to minimize light scattering, and thus preserve the luster and transparency of the pigment.

In one embodiment the pearlescent pigment has a CIELAB L* value of about 30 or less, and a chroma value of about 3 or less resulting in a pigment with a jet black pearlescent appearance. These methods have been used to produce very dark antique/black pearl interference pigments. The darkest color achieved based on a 5% pigment drawdown in a nitrocellulose varnish is in the range of about 29 to about 32 in terms of lightness value (L* value in CIE1976 color space, measured using a 10 degree observer, illuminant D65 with Specular Component Included), which is very close to the reference LENETA card black (L*=28) along with a very low chroma (typically less than 3). Titan® ST is the range of L*=64 to 65, Engelhard's Cloisonné NU-Antique Series is in the range of L*=37 to 60. In all cases, these are much lighter and less lustrous than the pigment formed by this process.

The methods described may produce pigments with better hiding power while maintaining a high luster. The pigments may have better stability than current pigments at high and low pH, and are less likely to bleed.

A cosmetic composition comprising the pearlescent pigment may be useful for make-up products for the skin, the eyes, or hair. Examples of compositions intended as make-up for the skin include eye shadows, eye liners, mascaras, powders, foundations, blushes, colored creams, nail varnish, lipsticks, lip gloss, and cover sticks. Examples of cosmetic applications involving the lip area, are lip gloss, lipstick, and other lip compositions.

Pearlescent pigments may be used to produce a makeup cosmetic as described in U.S. Pat. Nos. 6,663,852, 6,451,294, and 6280714.

General cosmetic compositions may contain preservatives, stabilizers, neutralizing agents, aqueous-phase thickeners (polysaccharide biopolymers, synthetic polymers) or fatty-phase thickeners, such as clay minerals, fillers, perfumes, hydrophilic or lipophilic active substances, surfactants, antioxidants, film-forming polymers and mixtures thereof. The amounts of these various ingredients are those conventionally employed in the fields in question and, for example, may be from 0.01 to 30% of the total weight of the composition.

Lip cosmetic composition may comprise any ingredient usually used in the field concerned, such as water, preferably in an amount ranging from 0 to 95% of the total weight of the composition, water-soluble or liposoluble dyes, antioxidants, essential oils, preserving agents, fragrances, neutralizing agents, liposoluble polymers, in particular hydrocarbon-based polymers such as polyalkylenes or polyvinyl laurate, gelling agents for an aqueous phase, gelling agents for a liquid fatty phase, waxes, gums, surfactants, additional cosmetic or dermatological active agents such as, for example, emollients, moisturizers (for example glycerol), vitamins, liquid lanolin, essential fatty acids, lipophilic or hydrophilic sunscreens, and mixtures thereof. The composition may also contain lipid vesicles of ionic and/or nonionic type. These ingredients (other than the water) may be present in the composition in a proportion of from 0 to 20% of the total weight of the composition.

In one embodiment the pearlescent pigment may be included in paint or ink compositions. In one embodiment the pearlescent pigment may be included in plastic compositions.

In one embodiment the pearlescent pigment may be included in compositions for cosmetic applications, printing inks, paints, surface coatings, plastics, glasses, ceramic materials, coatings for laser marking, pigment preparations, dry preparations, or textile printing.

The terms goniochromatic, iridescent, and pearlescent, may be used interchangeably to mean a change of color depending on the viewing angle.

For the purpose of measuring the CIELAB hue angle, $h_{ab}$, it will be measured with a white or black background using a D65 illuminant and a 10 degree observer.

Unless otherwise specified, the alkaline stability of a pigment is measured as $\Delta E^*$, using the procedure described in Example 32.

Unless otherwise specified, the HPI, and CIELAB coordinates of a pigment are measured using the pigment drawdown described in Example 32.

EXAMPLES

Example 1

$FeCl_3$—Urea Homogenous Hydrolysis Process for Depositing an Easily Reducible FeOOH Layer A 0.1M HCl solution (356.9 g) was added to a 500 ml cylindrical reaction vessel blade (for gentle stirring and non-sticking property). The solution was stirred at 175 RPM. A 7.1 g 45% wt $FeCl_3$ Stock Solution (Riedel 12322, 45% wt $FeCl_3$, 55% water) was add drop-wise into the reactor.

Urea (16 g) was added slowly into reactor under agitation.

Sky Chemical Russet Pigment (20 g) was added to the reactor, and stirred for 5 minutes.

The temperature was increased 2° C./min to 80° C. and held for 4 hour.

The pigment is recovered by filtration and washed with distilled water.

Example 2

Solid-On-Solid Catalytic Aqueous-Phase Hydrogenation Process

Step 1—Wet Micronization of Catalyst

Platinum oxide powder (200 mg, 10-50 micron grade, Aldrich 206032) was stirred in 100 g PEG 400 (i.e., 2 mg $PtO_2$/g fluid).

The slurry was loaded into a Eiger-Mill equipment with 0.5 mm zirconia media and water cooling jacket. The power was set to maximum and ran for 6 hours. The final slurry was a greenish black and did not settle for about 1 to 2 days.

The particle size was checked with dynamic light scattering (Horiba DLLS Particle Sizer) and OM (optical microscope, Nikon) to ensure no particles larger than 1 micron were left.

Step 2—Hydrogenation

PEG 400 (100 g), FeOOH (20 g) coated red pearl pigment (i.e., Sky Chemical Super Russet) and 3 g of the micronized $PtO_2$ slurry (2 mg catalyst/g fluid) from step 1, was loaded into a steel-constructed hydrogenation chamber.

An agitator was lowered into the chamber. The chamber was closed and connected to the $H_2$ reservoir.

The gas line was purged several times with $N_2$.

The chamber was pressurized with $H_2$ to roughly 10-14 bar.

The agitator was turned on and the heating mantle was set to 200° C.

The reaction was run for 6 hours.

The heating mantle was removed to let the chamber cool. The chamber head space and lines were purged with $N_2$ gas to remove any residual $H_2$.

The chamber was opened and the slurry was poured out into a container.

Step 3—Catalyst Recovery and Pigment Wash

The slurry was settled in the container. The pearl pigment will sink to the bottom much faster than colloidal $PtO_2$. As soon as the majority of the pigment settled, the supernatant was decanted, which was rich in $PtO_2$, and put aside for reuse.

The settled pigments were then washed several times with water and one time with industrial alcohol on a mesh filter (20 micron mesh) to remove the PEG and residual colloidal $PtO_2$.

The pigment was dried under mild vacuum.

Example 3

Preparation of Homogenous Platinum Collidal Nanoparticle Catalyst

Polyvinylpyrrolidone (PVP) Reductant Solution: Anhydrous ethylene glycol (80 g) and K15 PVP (10 g, Fluka 81390 or ISP) were mixed at 3000 RPM with a Hauschild mixer until dissolved. The mixture was added to a 1 L 3.5" Teflon Coated Cylindrical reactor with a 2" PTFE coated 3-leaf blade, and a nitrogen purging line.

Precursor Solution: Anhydrous ethylene glycol (80 g) and $H_2PtCl_6$-$6H_2O$ salt (0.5 g, SA C3044) were added to a 4 oz jar with a magnetic stir bar, and stirred until dissolved. The liquid was sonicated for 10 minutes to remove oxygen then added to the PVP reductant solution.

Mixing of Precursor and Reductant: Anhydrous ethylene glycol (80 g) was added to the reaction vessel, followed by agitation at roughly 200 RPM to gently mix precursor with reductant at room temperature. The $N_2$ purging line was lowered to just below the liquid surface to provide an insert gas blanket.

Thermal Activation: The mixture was heated from approximately 20° C. to 120° C. in roughly 100 minutes. The mixture was held at 120° C. for 1 hour before switching off the heat. The solution was allowed to cool in the oil bath back to room temperature.

Recovery: The Pt-in-(PVP-EG) liquid [0.75 mg Pt/q-fluid] was poured into a glass jar and the jar was sealed.

Example 4

Liquid-Phase Hydrogenation Process with a Homogenous Catalyst

Step 1—Hydrogenation

PEG 400 (10 g), FeOOH coated red pearl pigment (20 g, i.e., Sky Chemical Super Russet), and Pt colloidal solution (8 g) from Example 3 (300 ppm level of Pt, normalized to dry content of pigment) was loaded into a steel-constructed hydrogenation chamber.

An agitator was lowered into the chamber. The chamber was closed and connected to the $H_2$ reservoir.

The gas line was purged several times with $N_2$.

The chamber was pressurized with $H_2$ to roughly 10-14 bar.

The agitator was turned on and the heating mantle was set to 200° C. The reaction was run for 6 hours.

The heating mantle was removed to let the chamber cool. The chamber head space and lines were purged with $N_2$ gas to remove any residual $H_2$.

The chamber was opened and the slurry was pour out into a container.

Step 2—Catalyst Recovery and Pigment Wash

After the slurry was allowed to settle in a container, the supernatant fluid was discarded.

The settle pigments were then washed several times with 10% PVP in water and one time with industrial alcohol on a mesh filter (20 micron mesh) to remove PEG and residual colloidal Pt.

The pigment was dried under mild vacuum

Example 5

Analysis of the Colorimetric Parameters (CIE L*a*b*) of Onyx Black Produced by $FeCl_3$—Urea Homogenous (Step 1) Hydrolysis Followed by Liquid-Phase Hydrogenation Process with a Homogenous Catalyst (Step 3)

Step 1—FeOOH Deposition by $FeCl_3$-Urea Homogenous Hydrolysis

A 0.1M HCl solution (10,707 g) was added to a 15 L cylindrical reaction vessel. The solution was stirred at 175 RPM. A 213 g $FeCl_3$ Stock Solution (Riedel 12322, 45% wt $FeCl_3$, 55% water) was added drop-wise into the reactor.

Urea (1440 g) was added slowly into reactor under agitation.

Sudarshan Russet Pigment (600 g) was added to the reactor, and stirred for 5 minutes. This deposition technique is not exclusive to the Sudarshan Russet pigment. Other platelet-like substrates may be used including those comprising synthetic mica (uncoated or metal oxide coated) or flaky glass supports. These substrates may contain multiple adsorbed layers, such as those that contain materials of varying refractive index. It is important to note that equivalent levels of Fe uptake (g Fe/g mica) can be achieved using both pre-coated or uncoated supports by either redeposition or by adjustment of the reaction conditions.

The reaction temperature was increased 2° C./min to 90° C. and held for 4 hour.

The coated pigment was then recovered by vacuum filtration using a 10 micron filter. The filter cake was washed three times with 5 L of water. The coated pigment was then dried at 60° C. overnight.

Step 2—Hydrogenation

PEG 400 (1920 g), FeOOH coated red pearl pigment (400 g, i.e., Sudarshan Russet), and Pt colloidal solution (80 g) from Example 3 was loaded into a steel-constructed hydrogenation chamber.

An agitator was lowered into the chamber. The chamber was closed and connected to the $H_2$ reservoir.

The gas line was purged several times with $N_2$.

The chamber was pressurized with $H_2$ to roughly 340-380 psig.

The agitator was turned on and the heating mantle was set to 200° C.

The reaction was run for 6 hours.

The heating mantle was then removed to let the chamber cool. The chamber head space and lines were purged with $N_2$ gas to remove any residual $H_2$.

The chamber was opened and the slurry was poured out into a container.

The hydrogenated pigment was then recovered by vacuum filtration using a 10 micron filter. The filter cake was washed with 4 L of water followed by 2 L of ethanol.

The pigment was then placed in an oven at 60° C. for 24 hours.

Step 3—Pigment Drawdown Preparation

The hydrogenated pigment (0.5 g) was dispersed in 4.5 g of PPG Delstar PMR499 acrylic enamel in a max 15 translucent jar designed for the DAC150FVZ-K model (Hauschild Engineering) high speed mixer.

Glass beads (2 g) were added to the dispersed suspension.

The pigment suspension (10% pigment) was then mixed for 3 minutes at 3000 rpm using a DAC150FVZ-K model high speed mixer.

Three preparations of the same 10% pigment suspension were prepared using the procedure described above. Directly following mixing, each pigment suspension was applied to a Form 2C Leneta card using either a 1.5, 3 or 6 mil Bird applicator.

Each drawdown was allowed to dry at room temperature for 30 minutes and then placed in an oven at 60° C. for an additional 30 minutes.

The calorimetric parameters (CIE L*a*b*) of the dried films were measured using a 10 degree observer and D65 illuminant (specular component included and specular component excluded) against both a white and black reference background. The results of these measurements are listed in the tables below.

TABLE 1

Colorimetric parameters (CIE L*a*b*) of Onyx black (Example 5) drawdowns (10% pigment) using a 10 degree observer and D65 illuminant with specular component included (SCI) at varying film thickness with a black background reference.

| Thickness | Sample Over Black Background | | | | | Uncoated Black Background | | | | |
| --- | --- | --- | --- | --- | --- | --- | --- | --- | --- | --- |
| | L* | a* | b* | C* | h | L* | a* | b* | C* | h |
| 1.5 mil | 29.34 | 1.01 | −1.82 | 2.08 | 299.03 | 27.32 | 0.32 | −0.01 | 0.32 | 357.88 |
| 3.0 mil | 29.75 | 1.58 | −2.16 | 2.68 | 306.14 | 27.40 | 0.35 | −0.07 | 0.35 | 349.26 |
| 6.0 mil | 28.89 | 1.29 | −2.03 | 2.41 | 302.5 | 27.19 | 0.27 | −0.19 | 0.33 | 325.25 |

TABLE 2

Colorimetric parameters (CIE L*a*b*) of Onyx black (Example 5) drawdowns (10% pigment) using a 10 degree observer and D65 illuminant with specular component included (SCI) at varying film thickness with a white background reference.

| Thickness | Sample Over White Background | | | | | Uncoated White Background | | | | |
| --- | --- | --- | --- | --- | --- | --- | --- | --- | --- | --- |
| | L* | a* | b* | C* | h | L* | a* | b* | C* | h |
| 1.5 mil | 43.14 | 1.21 | −0.70 | 1.40 | 329.97 | 93.36 | −0.80 | 3.23 | 3.33 | 103.89 |
| 3.0 mil | 30.87 | 1.57 | −1.89 | 2.46 | 309.78 | 93.41 | −0.77 | 3.18 | 3.27 | 103.64 |
| 6.0 mil | 28.88 | 1.27 | −2.03 | 2.39 | 301.93 | 93.44 | −0.63 | 3.33 | 3.39 | 100.76 |

TABLE 3

Colorimetric parameters (CIE L*a*b*) of Onyx black (Example 5) drawdowns (10% pigment) using a 10 degree observer and D65 illuminant with specular component excluded (SCE) at varying film thickness with a black background reference.

| Thickness | Sample Over Black Background | | | | | Uncoated Black Background | | | | |
| --- | --- | --- | --- | --- | --- | --- | --- | --- | --- | --- |
| | L* | a* | b* | C* | h | L* | a* | b* | C* | h |
| 1.5 mil | 11.17 | 1.71 | −2.48 | 3.01 | 304.59 | 8.15 | 1.03 | 1.85 | 2.12 | 60.92 |
| 3.0 mil | 13.89 | 2.82 | −2.94 | 4.07 | 313.8 | 7.90 | 1.17 | 2.15 | 2.45 | 61.59 |
| 6.0 mil | 14.88 | 2.27 | −2.62 | 3.46 | 310.90 | 8.12 | 0.93 | 1.72 | 1.95 | 61.62 |

TABLE 4

Colorimetric parameters (CIE L*a*b*) of Onyx black (Example 5) drawdowns (10% pigment) using a 10 degree observer and D65 illuminant with specular component excluded (SCE) at varying film thickness with a white background reference.

| Thickness | Sample Over White Background | | | | | Uncoated White Background | | | | |
| --- | --- | --- | --- | --- | --- | --- | --- | --- | --- | --- |
| | L* | a* | b* | C* | h | L* | a* | b* | C* | h |
| 1.5 mil | 36.28 | 1.02 | 0.09 | 1.02 | 4.79 | 91.74 | −0.80 | 3.30 | 3.39 | 103.65 |
| 3.0 mil | 16.84 | 2.61 | −2.28 | 3.47 | 318.85 | 91.58 | −0.77 | 3.33 | 3.42 | 103.07 |
| 6.0 mil | 15.14 | 2.36 | −2.70 | 3.59 | 311.05 | 91.69 | −0.75 | 3.26 | 3.34 | 103.03 |

Example 6 (1156-147)

Neon Green-Gold Pearlescent Pigment

A mixture of HCl (706.2 g of 0.1 M solution), FeCl$_3$ (14.2 g of 45 wt % solution) urea (96 g), and TiO$_2$ coated natural mica pigment (40 g, SunPearl Iridescent Green, 10-60 μm particle size) was charged into a 1 L jacketed pot reactor under agitation at 180 rpm. The mixture had a pH of approximately 1.8. The mixture was then heated to 90° C. The pigment is complete when urea decomposition resulted in a rise of the solution pH to between about 6.3 and 6.5. After about 2 hours at 90° C., the pigment was filtered, rinsed with deionized water, and dried at 60-80° C. A neon-like lustrous pigment having a green interference color combined with a golden yellow absorbance color was obtained. The resulting pigment contained approximately 6.5 wt % elemental iron as measured using a Perkin Elmer 5100 PC Atomic Absorption Spectrophotometer. CIELab values measured for this pigment and the starting substrate with a Spectraflash SF600 Plus spectrophotometer are listed in Table 5.

Example 7 (1156-191)

Neon Gold Pearlescent Pigment

A neon gold pearlescent pigments was prepared via the same technique demonstrated in Example 1, except the amount of each reagent initially charged to the reaction vessel is different as depicted in Table 6. As shown in Table 6, the amount of FeCl$_3$ used for coating was twice that used in Example 1 with the same Urea/Fe molar ratio of 40.6 and the same starting substrate. Following filtration, washing, and drying, a neon-like lustrous pigment having a golden interference color was obtained (see Table 5 for CIELab values). The resulting pigment contained approximately 10.7 wt % elemental iron.

This example illustrates thicker coatings of FeOOH layers on TiO$_2$-coated platelet-like substrates can be utilized to progress the interference color to the next shade. This is evident by comparison of the hue angle measured over a black background (see Table 5) for the coated substrates and the starting material. The uncoated substrate has a green interference color with a hue angle of 205.1. FeOOH coating progresses the hue angle clockwise with increasing thickness. As shown for a reaction Fe/pigment mass ratio of 0.055 (or 6.5 wt % Fe in the final pigment), the hue angle progresses from a green interference color (hue angle=205.1) to a green-gold interference color (hue angle=108.6). At about double the reaction Fe/pigment mass ratio (which results in 10.7 wt % Fe in the final pigment), the hue angle further progresses to a more golden interference color (hue angle=83.0).

Increased FeOOH deposition results in a darkening of the substrate, or a drop in the L* value, as shown in Table 5. The L* value of the starting material with both white and black backgrounds is reduced as the Fe/pigment mass ratio used in deposition is increased.

TABLE 5

CIE Lab values measured for Examples 6 and 7 using a 10° observer and D65 illuminant with specular component included. Pigment drawdowns (3 mil Bird applicator) were prepared by dispersing 0.75 g pigment in 5 g of vehicle (10% CAB 531-1 (Eastman Chemical) in n-butyl acetate).

| Example | Reaction Fe/Pigment Ratio (g/g) | Final Interference Color | White Background | | | | | Black Background | | | | |
|---|---|---|---|---|---|---|---|---|---|---|---|---|
| | | | L* value | a* value | b* value | Chroma | Hue Angle | L* value | a* value | b* value | Chroma | Hue Angle |
| SunPearl Iridescent Green | 0 | Transparent Green | 92.8 | −2.3 | 5.6 | 6.0 | 112.5 | 79.9 | −12.7 | −6.0 | 14.0 | 205.1 |
| 6 | 0.055 | Transparent Green/Gold | 78.2 | 3.7 | 35.5 | 35.5 | 84.1 | 72.8 | −9.2 | 27.5 | 29.0 | 108.6 |
| 7 | 0.110 | Transparent Gold | 74.7 | 12.4 | 46.9 | 48.5 | 75.2 | 68.4 | 4.7 | 38.3 | 38.6 | 83.0 |

TABLE 6

Quantity of reagents used for Fe(OH)$_3$ deposition on commercially-available TiO$_2$-coated natural mica substrates.

| Example | Substrate Brand Name | Initial Reaction Solution Composition | | | |
|---|---|---|---|---|---|
| | | Pigment (g) | 45 wt % FeCl$_3$ (g) | Urea (g) | 0.1 M HCl (g) |
| 6 | SunPearl Iridescent Green | 40 | 14.2 | 96 | 706.2 |
| 7 | SunPearl Iridescent Green | 40 | 28.4 | 192 | 706.2 |
| 10 | SunPearl Iridescent Gold | 40 | 14.2 | 96 | 706.2 |
| 11 | SunPearl Iridescent Gold | 40 | 28.4 | 192 | 706.2 |
| 14 | SunPearl Iridescent Red | 40 | 3.55 | 24 | 706.2 |
| 15 | SunPearl Iridescent Red | 40 | 7.1 | 48 | 706.2 |
| 16 | SunPearl Iridescent Red | 40 | 14.2 | 96 | 706.2 |
| 19 | SunPearl Iridescent Violet | 40 | 14.2 | 48 | 706.2 |
| 20 | SunPearl Iridescent Violet | 40 | 28.4 | 192 | 706.2 |
| 23 | SunPearl Iridescent Blue | 40 | 14.2 | 48 | 706.2 |
| 24 | SunPearl Iridescent Blue | 40 | 28.4 | 192 | 706.2 |

Example 8 (1156-149)

Lustrous, Semi-Opaque Green Pearlescent Pigment

The pigment prepared in Example 6 (20 g, Mica+TiO$_2$+Fe(OH)$_3$, particle size of 10-60 μm) and PVP stabilized Pt catalyst (4 g) in ethylene glycol (prepared in Example 3) were dispersed in polyethylene glycol 400 (96 g, PEG 400, EMD Chemical, CAS 25322-68-3), and added to a 600 mL steel Parr reactor equipped with twin 45 degree pitch blade impellers. The mixture was agitated at approximately 800 rpm. The reaction solution was purged several times by pressurizing the vessel with nitrogen and then evacuating under vacuum. Following sufficient purging, the mixture was heated to 220° C., pressurized with hydrogen to 10.3 bar and held at these conditions for 6 hours. The pigment was filtered, rinsed with 4 L deionized water followed by 1 L ethanol, and dried at 60-80° C. A deep and intensely colored, semi-opaque, green pearlescent pigment (see Table 7 for corresponding CIE Lab color values) was obtained.

The weight fraction of Fe(II) and Fe(III) in the final pigment is given in Table 8. Total iron and Fe(II) content was determined via atomic absorption spectroscopy and oxidation/reduction titration with 0.1 N potassium dichromate, respectively. The hydrogenation resulted in reduction of approximately 15.4% of the deposited iron (Fe(III) to Fe(II)).

As shown in Table 7, this reduction process transformed the bichroic starting material (Example 6) into a more opaque pigment with more uniform color coordinates as measured with white and black backgrounds. The level of opacity, or hiding power can be described using a hiding power index (HPI) defined as:

$$HPI = \frac{1}{|L^*(\text{black}) - L^*(\text{white})|} \quad (3)$$

where L*(black) and L*(white) are the measured lightness or L* value on a black and white background, respectively. Full opacity is obtained when L*(black) is equivalent to L*(white) causing the hiding power index to equate to infinity. The HPI associated with this pigment is listed in Table 7.

TABLE 8

Total composition of Fe(II) and Fe(III) measured for Examples 8 and 9.

| Example | Total Fe (g/g) | Fe(II) (g/g) | Fe(III) (g/g) | Fe(II)/Total Fe (g/g) | Fe(III)/Total Fe (g/g) |
|---|---|---|---|---|---|
| 4 | 0.065 | 0.01 | 0.055 | 0.15 | 0.85 |
| 5 | 0.107 | 0.017 | 0.09 | 0.16 | 0.84 |

Example 9 (1174-002)

Lustrous, Opaque Gold Pearlescent Pigment

An intensely colored, gold pearlescent pigments with increased opacity relative to Example 8, was prepared according to the procedure for Example 8 except that the Fe/Pigment mass ratio used in deposition was increased by two-d resulting in higher weight fraction of Fe in the final pigment (see Tables 7 and 8). As shown by the CIELab values listed in Table 7, a vibrantly colored gold pearlescent pigment was obtained following hydrogenation. The resulting pigment has higher opacity, or higher hiding power index relative to Example 8 (50.0 compared to 1.56 for Example 3) as shown in Table 7.

The progression of the interference color of TiO$_2$-coated platelet like substrates and the opacity may be precisely controlled by the Fe/pigment mass ratio. As will be shown in the following examples, the two-step process (coating and reduction) may be applied to TiO$_2$ coated mica pigments with various interference colors such as: gold, red, violet, blue, green, and silver. An infinite number of lustrous, colored pearlescent pigments that span all four quadrants of the CIELab color coordinate system may be produced while controlling the opacity to suit the intended application.

The color and opacity is directly controlled by the thickness of both the initial TiO$_2$ and the deposited FeOOH layers. For semi-opaque shades (as described in Example 8), the reduction of thin FeOOH layers result in pigments characterized by a simple progression of the initial interference color or hue angle as shown in Table 7. Reduction of thicker FeOOH layers results in further advancement of the interference color

TABLE 7

CIE Lab values measured/for Examples 8 and 9 using a 10° observer and D65 illuminant with specular component included. Pigment drawdowns (3 mil Bird applicator) were prepared by dispersing 0.75 g pigment in 5 g of vehicle (10% CAB 531-1 (Eastman Chemical) in n-butyl acetate).

| Example | Reaction Fe/Pigment Ratio (g/g) | Final Interference Color | HPI | White Background L* value | a* value | b* value | Chroma | Hue Angle | Black Background L* value | a* value | b* value | Chroma | Hue Angle |
|---|---|---|---|---|---|---|---|---|---|---|---|---|---|
| SunPearl Iridescent Green | 0 | Transparent Green | 0.078 | 92.8 | −2.3 | 5.6 | 6.0 | 112.5 | 79.9 | −12.7 | −6.0 | 14.0 | 205.1 |
| 8 | 0.055 | Semi-Opaque Green | 1.56 | 61.9 | −10.2 | 20.1 | 22.6 | 116.8 | 61.3 | −11.7 | 19.4 | 22.6 | 121.1 |
| 9 | 0.011 | Opaque Gold | 50.0 | 48.3 | 5.8 | 22.8 | 23.5 | 75.7 | 48.3 | 5.6 | 22.7 | 23.4 | 76.0 | or hue angle and can progress the interference color to the next shade (in the case of Example 5, from green to yellow) while increasing the opacity or HPI.

Examples 10 through 13

Development of Lustrous, Pearlescent Pigments using $TiO_2$-Coated Mica with a Gold Intererence Color The methods described above may be applied to $TiO_2$-coated mica substrates characterized by a yellow or gold interference color. Examples 10 and 11 are analogous to 6 and 7, except that that the substrate material used was SunPearl Iridescent Gold (10-60 µm) rather than SunPearl Iridescent Green. The composition of the reaction solution for both Example 10 and 11 is shown in Table 6 with the CIELab values of the resulting pigments given in Table 9.

As shown previously, FeOOH deposition results in clockwise advancement of the hue angle (over a black background) of the starting substrate (see Table 9). The initial gold interference color (hue angle=93.4) is advanced to orange gold (Example 6, hue angle=68.6) at low Fe loading and further to pink (hue angle=24.2) at increased FeOOH layer thickness. Following deposition, these pigments are goniochromatic, or characterized by a specific interference color (in this case, orange, gold, or pink) at some viewing angles, with a gold to yellow absorbance color at others. The gold to yellow absorbance color is due to the precipitated yellow iron oxide or FeOOH layer. As the FeOOH thickness increases, the darkness of the coated pigment increases as shown by the measured L* values depicted in Table 9.

The reduction of Examples 10 and 11 by the hydrogenation method described in Example 8, yielded Examples 12 and 13, respectively. Example 12 is a lustrous semi-opaque, orange pigment with a HPI of 0.267. Due to the relatively thin FeOOH layer, reduction resulted in a small advancement of the hue angle, shifting the interference color from gold to orange. Although the conditions for reduction between Examples 12 and 13 were equivalent, Example 13 yields a more opaque (HPI=1.099), darker, lustrous plum pigment. The larger color shift, from a hue angle of 49.2 (Example 12 on a black background) to 354.7 (Example 13 on a black background), and the increase in opacity is due to the increased thickness of the coated FeOOH layer.

Examples 14 through 19

Development of Lustrous, Pearlescent Pigments using $TiO_2$-Coated Mica with a Red Interference Color Examples 14 through 19 were prepared according to the procedure described in Example 6, except that the $TiO_2$-coated mica substrates (SunPearl Iridescent Red, 10-60 µm) were characterized by a pink to red interference color. The reaction Fe/Pigment mass ratios used are indicated in Table 6. The CIELab values for each pigment prepared are shown in Table 10.

For clarity, the a* and b* coordinates of Examples 14-16 measured against a black background are plotted in FIG. 1. Pigment drawdowns (3 mil Bird applicator) of Examples 14-16 were prepared by dispersing 0.75 g pigment in 5 g of vehicle (10% CAB 531-1 (Eastman Chemical) in n-butyl acetate). FIG. 1 shows that deposition at very low Fe/pigment ratios, in particular for Fe/pigment ratios less than about 0.055, results in an initial increase in the b* coordinate with small impact on the a* value. This is perhaps due to the characteristic yellow absorbance of FeOOH. It is from this point, point 2 in FIG. 1, that the clockwise shift in hue angle begins at increasing FeOOH layer thickness. As shown, the hue angle begins to progress pass the initial hue angle of the support material at Fe/pigment ratios of about 0.055. For Example 16 (Fe/pigment ratio=0.055), the interference color is noticeably violet indicating sufficient progression to the next shade (red to violet).

The reduction of Examples 14-16 by the hydrogenation method described in Example 8, yielded Examples 17-19, respectively. As shown by the CIELab values depicted in Table 10, reduction yields lustrous, pearlescent pigments ranging from pink to light violet, and the hiding power index, or HPI, associated with these pigments increased with increasing Fe/pigment mass ratio.

TABLE 9

CIE Lab values measured for Examples 10-13 using a 10° observer and D65 illuminant with specular component included. Pigment drawdowns (3 mil Bird applicator) were prepared by dispersing 0.75 g pigment in 5 g of vehicle (10% CAB 531-1 (Eastman Chemical) in n-butyl acetate).

| Example | Reaction Fe/Pigment Ratio (g/g) | Final Interference Color | HPI | White Background | | | | | Black Background | | | | |
|---|---|---|---|---|---|---|---|---|---|---|---|---|---|
| | | | | L* value | a* value | b* value | Chroma | Hue Angle | L* value | a* value | b* value | Chroma | Hue Angle |
| SunPearl Iridescent Gold | 0 | Transparent Gold | 0.094 | 93.3 | −1.3 | 9.6 | 9.69 | 97.9 | 82.59 | −1.0 | 17.6 | 17.6 | 93.4 |
| 10 | 0.055 | Transparent Orange-Gold | 0.118 | 76.8 | 16.2 | 46.8 | 49.6 | 70.9 | 68.4 | 14.3 | 36.4 | 39.1 | 68.6 |
| 11 | 0.110 | Transparent Pink | 0.091 | 67.0 | 26.7 | 29.1 | 39.5 | 47.5 | 56.0 | 24.2 | 10.9 | 26.5 | 24.2 |
| 12 | 0.055 | Semi-Opaque Orange | 0.267 | 59.6 | 28.9 | 34.8 | 45.2 | 50.3 | 55.9 | 25.6 | 29.7 | 39.2 | 49.2 |
| 13 | 0.110 | Semi Opaque Plum | 1.099 | 37.9 | 15.6 | −0.5 | 15.6 | 358.0 | 37.0 | 14.9 | −1.4 | 15.0 | 354.7 |

TABLE 10

CIE Lab values measured for Examples 14-19 using a 10° observer and D65 illuminant with specular component included. Pigment drawdowns (3 mil Bird applicator) were prepared by dispersing 0.75 g pigment in 5 g of vehicle (10% CAB 531-1 (Eastman Chemical) in n-butyl acetate).

| Example | Reaction Fe/Pigment Ratio (g/g) | Final Interference Color | HPI | White Background ||||| Black Background |||||
|---|---|---|---|---|---|---|---|---|---|---|---|---|---|
| | | | | $L^*$ value | $a^*$ value | $b^*$ value | Chroma | Hue Angle | $L^*$ value | $a^*$ value | $b^*$ value | Chroma | Hue Angle |
| SunPearl Iridescent Red | 0 | Transparent Pink/Red | 0.047 | 91.9 | 1.14 | 4.36 | 4.51 | 75.3 | 70.7 | 17.3 | −6.6 | 18.5 | 339.3 |
| 14 | 0.01375 | Transparent Pink | 0.069 | 83.2 | 11.9 | 21.6 | 24.7 | 61.2 | 68.8 | 17.3 | 3.0 | 17.5 | 9.8 |
| 15 | 0.0275 | Transparent Pink | 0.073 | 79.4 | 17.0 | 21.1 | 27.1 | 51.0 | 65.7 | 18.7 | 1.6 | 18.8 | 4.8 |
| 16 | 0.055 | Transparent Pink-Violet | 0.059 | 70.7 | 23.1 | 12.7 | 26.4 | 28.8 | 53.7 | 19.1 | −14.5 | 24.0 | 322.8 |
| 17 | 0.01375 | Transparent Pink | 0.068 | 72.6 | 23 | 15.3 | 27.6 | 33.6 | 58.0 | 26.2 | −4.9 | 26.6 | 349.4 |
| 18 | 0.0275 | Transparent Pink | 0.095 | 63.4 | 31.5 | 9.5 | 32.9 | 16.8 | 52.9 | 27.8 | −6.9 | 28.7 | 346.2 |
| 19 | 0.055 | Semi-Opaque Light Violet | 0.305 | 47.7 | 18.2 | −12.9 | 22.3 | 324.6 | 44.4 | 18.4 | −17.4 | 25.3 | 316.6 |

Examples 20 Through 23

Development of Lustrous, Pearlescent Pigments using Coated Mica with a Violet Interference Color Examples 20 and 21 were prepared according to the procedure described in Example 6, except the TiO$_2$-coated mica substrate had a violet interference color (SunPearl Iridescent Violet, 10-60 μm), and used reaction Fe/pigment ratios of 0.055 and 0.110, respectively as shown in Table 6. The CIELab values for the pigments following FeOOH deposition are given in Table 11.

TABLE 11

CIE Lab values measured for Examples 20-23 using a 10° observer and D65 illuminant with specular component included. Pigment drawdowns (3 mil Bird applicator) were prepared by dispersing 0.75 g pigment in 5 g of vehicle (10% CAB 531-1 (Eastman Chemical) in n-butyl acetate).

| Example | Reaction Fe/Pigment Ratio (g/g) | Final Interference Color | HPI | White Background ||||| Black Background |||||
|---|---|---|---|---|---|---|---|---|---|---|---|---|---|
| | | | | $L^*$ value | $a^*$ value | $b^*$ value | Chroma | Hue Angle | $L^*$ value | $a^*$ value | $b^*$ value | Chroma | Hue Angle |
| SunPearl Iridescent Violet | 0 | Transparent Violet | 0.047 | 91.2 | 1.4 | 2.5 | 2.9 | 60.2 | 69.7 | 17.7 | −16.7 | 24.3 | 316.7 |
| 20 | 0.055 | Transparent Violet | 0.064 | 74.9 | 16.7 | 12.6 | 20.9 | 37.07 | 59.3 | 6.1 | −13.1 | 14.5 | 295.0 |
| 21 | 0.110 | Transparent Blue | 0.096 | 72.8 | 8.6 | 21.6 | 23.3 | 68.4 | 62.4 | −11.4 | 4.3 | 12.2 | 159.4 |
| 22 | 0.055 | Semi-Opaque Dark Violet | 0.532 | 44.2 | 3.9 | −21.1 | 21.5 | 280.4 | 42.3 | 2.0 | −23.9 | 24.0 | 274.8 |
| 23 | 0.110 | Opaque Dark Blue | 4.762 | 43.5 | −10.4 | −5.5 | 11.8 | 208.0 | 43.3 | −10.8 | −6.04 | 12.4 | 209.24 |

The pigments of Examples 20 and 21 displayed the characteristic clockwise shift in hue angle, resulting in the gradual progression from a violet to blue interference color at increased Fe/pigment ratio. The reduction of Examples 20 and 21, using the conditions described in Example 8, yielded Examples 22 and 23, respectively. As shown in Table 11, the reduction of thin FeOOH surface layers (such as Example 22) yields a semi-opaque pearlescent pigment characterized by a color similar to the interference color of the $TiO_2$-coated mica support. In this case, Example 22 yields a lustrous, dark violet pearlescent pigment. Reduction of thicker FeOOH layers, such as the pigment produced in Example 23, results in an advancement of the interference color to the next shade (in this case from violet to blue) and increased opacity or HPI.

Examples 24 through 27

Development of Lustrous, Pearlescent Pigments using $TiO_2$-Coated Mica with a Blue Interference Color Examples 24 and 25 were prepared according to the procedure described in Example 6, except the $TiO_2$-coated mica substrate had a blue interference color (SunPearl Iridescent Blue, 10-60 μm), and used reaction Fe/pigment ratios of 0.055 and 0.110, respectively, as shown in Table 6. The CIELab values are given in Table 12.

and 25, using the conditions described in Example 6 yielded Examples 26 and 27, respectively. As shown in Table 12, the reduction of thin FeOOH surface layers (such as Example 26) yields a semi-opaque pearlescent pigment characterized by a color similar to the interference color of the $TiO_2$-coated mica support. In this case, Example 26 yields a lustrous, turquoise pearlescent pigment. Reduction of thicker FeOOH layers, such as the pigment produced in Example 27, results in an advancement of the interference color to the next shade (in this case from an iridescent blue to opaque olive green) and increased opacity or HPI.

The examples described above indicate that an almost infinite number of lustrous, vibrant colored pearlescent shades with controlled opacity may be prepared by the methods described herein. The potential color range spans the CIELab color space.

Examples 28 Through 31

Development of Lustrous, Pearlescent Pigments using $TiO_2$-Coated Mica with a Silver Interference Color Examples 28 and 29 were prepared according to the procedure described in Example 6, except the $TiO_2$-coated mica

TABLE 12

CIELab values measured for Examples 24-27 using a 10° observer and D65 illuminant with specular component included. Pigment drawdowns (3 mil Bird applicator) were prepared by dispersing 0.75 g pigment in 5 g of vehicle (10% CAB 531-1 (Eastman Chemical) in n-butyl acetate).

| | Reaction | Final | | White Background | | | | | Black Background | | | | |
|---|---|---|---|---|---|---|---|---|---|---|---|---|---|
| Example | Fe/Pigment Ratio (g/g) | Interference Color | HPI | L* value | a* value | b* value | Chroma | Hue Angle | L* value | a* value | b* value | Chroma | Hue Angle |
| SunPearl Iridescent Blue | 0 | Transparent Blue | 0.053 | 92.2 | −1.0 | 0.9 | 1.3 | 137.5 | 73.2 | −7.1 | −22.5 | 23.6 | 252.5 |
| 24 | 0.055 | Transparent Blue | 0.103 | 76.7 | 5.9 | 15.7 | 16.8 | 69.37 | 67.0 | −15.8 | −0.2 | 15.8 | 180.6 |
| 25 | 0.110 | Transparent Green Gold | 0.173 | 71.4 | 5.6 | 35.3 | 35.7 | 81.1 | 65.6 | −9.51 | 25.9 | 27.6 | 110.2 |
| 26 | 0.055 | Semi-Opaque Turquoise | 0.520 | 60.3 | −8.5 | 1.2 | 8.6 | 171.7 | 58.4 | −17.0 | −3.4 | 17.4 | 191.3 |
| 27 | 0.110 | Opaque Olive Green | 2.170 | 49.5 | −9.9 | 13.4 | 16.6 | 126.4 | 49.1 | −10.1 | 12.8 | 16.3 | 128.4 |

The pigments of Examples 24 and 25 displayed the characteristic clockwise shift in hue angle resulting in the gradual progression from a blue to green interference color at increased Fe/pigment ratio. The reduction of Examples 24 substrate had a silver interference color (SunPearl Silver White, 10-60 μm), and used Fe/pigment ratios of 0.055 and 0.110, respectively, as shown in Table 13. The CIELab values are given in Table 14.

TABLE 13

Quantity of reagents used for FeOOH deposition on commercially-available $TiO_2$-coated natural mica substrates.

| | | Initial Reaction Solution Composition | | | |
|---|---|---|---|---|---|
| Example | Substrate Brand Name | Pigment (g) | 45 wt % $FeCl_3$ (g) | Urea (g) | 0.1 M HCl (g) |
| 28 | SunPearl Silver White | 40 | 14.2 | 96 | 706.2 |
| 29 | SunPearl Silver White | 40 | 28.4 | 192 | 706.2 |

TABLE 14

CIELab values measured for Examples 28-31 using a 10° observer and D65 illuminant with specular component included. Pigment drawdowns (3 mil Bird applicator) were prepared by dispersing 0.75 g pigment in 5 g of vehicle (10% CAB 531-1 (Eastman Chemical) in n-butyl acetate).

| Example | Reaction Fe/Pigment Ratio (g/g) | Final Interference Color | HPI | White Background | | | | | Black Background | | | | |
|---|---|---|---|---|---|---|---|---|---|---|---|---|---|
| | | | | L* value | a* value | b* value | Chroma | Hue Angle | L* value | a* value | b* value | Chroma | Hue Angle |
| SunPearl Silver White | 0 | Transparent Silver | 0.136 | 93.0 | −0.1 | 3.6 | 3.6 | 91.2 | 85.6 | −1.5 | −2.4 | 2.9 | 237.8 |
| 28 | 0.055 | Transparent Gold-Silver | 0.232 | 85.4 | 6.3 | 21.5 | 22.4 | 73.6 | 81.0 | 0.6 | 14.7 | 14.7 | 87.8 |
| 29 | 0.110 | Transparent Gold | 0.376 | 78.1 | 8.8 | 28.5 | 29.8 | 72.9 | 75.5 | 3.9 | 24.6 | 25.0 | 81.1 |
| 30 | 0.055 | Semi-Opaque Champagne | 0.862 | 76.7 | 6.4 | 21.7 | 22.6 | 73.5 | 75.6 | 4.4 | 19.9 | 20.4 | 77.5 |
| 31 | 0.110 | Opaque Metallic Grey | 1.852 | 61.9 | 1.8 | 12.6 | 12.8 | 81.9 | 61.4 | 1.5 | 12.2 | 12.3 | 83.11 |

As shown in Table 14, FeOOH deposition results in a transition from a transparent silver white to golden shades. The deposition of thicker FeOOH layers results in a more golden color and a noticeably darker appearance (lower $L^*$ value). The reduction of Examples 28 and 29, using the conditions described in Example 8 yielded Examples 30 and 31, respectively. Example 30 is a lustrous, semi-opaque, champagne-colored pearlescent pigment with a HPI of 0.862. At increased reaction Fe/pigment mass ratio, as used in Example 31, gave a more opaque (HPI=1.852), metallic grey pearlescent pigment with a darker appearance (lower $L^*$ value, see Table 14).

Example 32

Alkaline Stability Testing—Blue Pearlescent Pigments

Example 23 and six commercially available blue pearlescent pigments were tested for alkaline stability. The samples tested and their corresponding components are listed in Table 15.

TABLE 15

Pigment samples tested for alkaline (pH 12.5) stability.

| Sample | Supplier | Product Code | Composition | Particle Size Range (μm) |
|---|---|---|---|---|
| Example 23 | Sun Chemical | | Mica, $TiO_2$, $Fe_3O_4$ | 10-60 |
| Duocrome ® BY | Engelhard | 226C | Mica, $TiO_2$, Iron Blue | 6-50 |
| Duocrome ® BR | Engelhard | 426C | Mica, $TiO_2$, Iron Blue | 6-50 |
| Duocrome ® BV | Engelhard | 526C | Mica, $TiO_2$, Iron Blue | 6-50 |
| Duocrome ® BG | Engelhard | 826C | Mica, $TiO_2$, Iron Blue | 6-50 |
| Cosmica ® Blue | Engelhard | MCB27 | Mica, Iron Blue | 6-48 |
| Cloisonné ® Blue | Engelhard | 626C | Mica, $TiO_2$, Iron Blue | 6-48 |

A basic solution (pH 12.5, NaOH in distilled water) was mixed with 2 wt % pigment (see Table 15) to prepare suspensions. The suspensions were mixed, and allowed to settle for about 5 hours. The pigments were then filtered, rinsed with deionized water, and dried at 80° C.

Pigment drawdowns (3 mil Bird applicator) were prepared by dispersing 0.5 g of each pigment in 4.5 g of vehicle (PPG Delstar DMR499 Acrylic Enamel), followed by applying the mixture to a Leneta Form 2C opacity card. The CIELab color coordinates (10° observer and D65 illuminant with specular component included) for the treated and untreated samples were measured using a Spectraflash SF600 Plus spectrophotometer. The hiding power index (before and after treatment) and color difference or $\Delta E^*$ ($\Delta E^* = ((\Delta L^*)^2 + (\Delta a^*)^2 + (\Delta b^*)^2)^{1/2}$) between the treated and untreated samples were measured against a black and white background, see Table 16.

TABLE 16

Hiding power index (HPI) and color difference values ($\Delta E^*$) for blue pearlescent pigment samples before and after alkaline treatment (pH 12.5, 5 hours).

| | | | $\Delta E^*$ (Treated vs Untreated) | |
|---|---|---|---|---|
| Sample | HPI (Untreated) | HPI (Treated) | White Background | Black Background |
| Example 23 | 0.469 | 0.408 | 1.71 | 1.40 |
| Duocrome ® BY | 0.294 | 0.068 | 39.66 | 21.82 |
| Duocrome ® BR | 0.110 | 0.036 | 46.01 | 15.29 |
| Duocrome ® BV | 0.091 | 0.033 | 50.75 | 13.26 |
| Duocrome ® BG | 0.315 | 0.063 | 45.99 | 20.84 |
| Cosmica ® Blue | 0.649 | 0.119 | 14.23 | 2.79 |
| Cloisonné ® Blue | 0.169 | 0.039 | 56.50 | 16.94 |

All the commercially available blue pearlescent pigments tested displayed a marked shift in color and opacity following immersion in alkaline solution. The measured color difference is due to the instability of iron blue in alkaline environment. The absence of iron blue or ferric ferrocyamide in the preparation of blue pearlescent pigments represents a significant advantage in terms of alkaline stability. For the blue pearlescent pigment prepared as described in Example 23, the treated and untreated samples showed a small relative color difference ($\Delta E^* < 2$) with a marginal drop in opacity (HPI drop from 0.469 to 0.408).

Example 33

Acid Stability Testing—Red/Pink Pearlescent Pigments

Example 18 and six commercially available red/pink mica based pearlescent pigments were tested for acid stability. The samples tested and their corresponding components are listed in Table 17.

TABLE 17

Pigment samples tested for acid (pH 1.5) stability.

| Sample | Supplier | Product Code | Composition | Particle Size Range (μm) |
|---|---|---|---|---|
| Example 18 | Sun Chemical | | Mica, $TiO_2$, $Fe_3O_4$ | 10-60 |
| Duocrome ® RY | Engelhard | 224C | Mica, $TiO_2$, Carmine | 6-50 |
| Duocrome ® RO | Engelhard | 324C | Mica, $TiO_2$, Carmine | 6-50 |
| Duocrome ® RV | Engelhard | 524C | Mica, $TiO_2$, Carmine | 6-50 |
| Gemtone ® Ruby | Engelhard | G010 | Mica, $TiO_2$, Iron Oxide, Carmine | 6-48 |
| Cloisonné ® Red | Engelhard | 424C | Mica, $TiO_2$, Carmine | 6-48 |
| Cloisonné ® Nu Antique Red | Engelhard | 424CB | Mica, $TiO_2$, Iron Oxides, Carmine | 6-48 |
| Cosmica ® Red | Engelhard | MCNR4 | Mica, Carmine | 6-48 |

An acidic solution (pH 1.5 of concentrated HCl in distilled water) was mixed with 2 wt % pigment (see Table 17) to prepare a suspension. The suspensions were mixed, and allowed to settle for about 20 hours. The pigments were filtered, rinsed with deionized water and dried at 80° C.

Drawdown preparation and color analysis was performed as described in the previous example. The hiding power index (before and after treatment) and color difference or $\Delta E^*$ between the treated and untreated samples measured against a black and white background is shown in Table 18.

As shown in Table 18, the pink pearlescent pigment of Example 18 showed the lowest color difference (or lower $\Delta E^*$) against a white background following exposure to acidic conditions. Only the Cosmica® Red showed lower $\Delta E^*$ measured against a black background. This low value of $\Delta E^*$ measured for the Cosmica® Red sample is due to the similarity of its $L^*$ value ($L^*=27.25$) with that of the black background ($L^*=27.20$) as shown in Table 19. In reality, the Cosmica® Red sample showed significant degradation as is evident by its marked change in color coordinates measured against a white background as depicted in Table 20 ($\Delta E^*=16.258$).

TABLE 18

Hiding power index (HPI) and color difference values ($\Delta E^*$) for red pearlescent pigment samples before and after acid treatment (pH 1.5, 20 hours).

| | | | $\Delta E^*$ (Treated vs Untreated) | |
|---|---|---|---|---|
| Sample | HPI (Untreated) | HPI (Treated) | White Background | Black Background |
| Example 18 | 0.063 | 0.058 | 3.024 | 1.589 |
| Duocrome ® RY | 0.159 | 0.120 | 12.068 | 7.944 |
| Duocrome ® RO | 0.098 | 0.069 | 17.154 | 7.753 |
| Duocrome ® RV | 0.060 | 0.047 | 17.615 | 5.524 |
| Gemtone ® Ruby | 0.254 | 0.225 | 3.935 | 2.609 |
| Cloisonné ® Red | 0.077 | 0.061 | 15.263 | 6.402 |
| Cloisonné ® Nu Antique Red | 1.111 | 0.546 | 3.311 | 2.097 |
| Cosmica ® Red | 0.066 | 0.035 | 16.258 | 1.432 |

TABLE 19

CIE Lab values measured against a black background using a 10° observer and D65 illuminant with specular component included. Pigment drawdowns (3 mil Bird applicator) were prepared by dispersing 0.5 g pigment in 4.5 g of vehicle (PPG Delstar DMR499 Acrylic Enamel).

| | Untreated Pigment | | | | | Treated Pigment (pH 1.5, 20 hr) | | | | |
|---|---|---|---|---|---|---|---|---|---|---|
| Sample | $L^*$ value | $a^*$ value | $b^*$ value | Chroma | Hue angle | $L^*$ value | $a^*$ value | $b^*$ value | Chroma | Hue angle |
| Example 18 | 45.80 | 23.5 | -9.39 | 25.31 | 338.22 | 46.45 | 24.54 | -8.38 | 25.94 | 341.15 |
| Duocrome ® RY | 64.52 | 9.67 | 16.08 | 18.76 | 58.99 | 68.58 | 4.1 | 20.03 | 20.45 | 78.43 |
| Duocrome ® RO | 56.84 | 19.45 | 10.75 | 22.23 | 28.93 | 60.79 | 14.3 | 14.99 | 20.71 | 46.35 |
| Duocrome ® RV | 46.73 | 24.7 | -30.39 | 39.17 | 309.11 | 49.61 | 21.08 | -27.37 | 34.55 | 307.61 |
| Gemtone ® Ruby | 45.79 | 29.83 | 0.00 | 29.83 | 360 | 47.42 | 28.35 | 1.4 | 28.38 | 2.83 |
| Cloisonne ® Red | 49.2 | 29.66 | -10.24 | 31.38 | 340.96 | 52.74 | 26.01 | -6.35 | 26.78 | 346.29 |
| Cloisonne ® Nu Antique Red | 35.83 | 14.82 | -6.35 | 16.12 | 336.78 | 37.53 | 14.45 | -5.18 | 15.35 | 340.28 |
| Cosmica ® Red | 27.25 | 4.14 | 0.97 | 4.25 | 13.19 | 27.08 | 3.11 | -0.01 | 3.11 | 359.74 |

In addition to improved color consistency in the dry form, the pigment of Example 18 was the only sample that showed no signs of colorant bleeding into the acidic solution. Following filtration of the acidic suspensions, the filtrate was analyzed in the visible region for colorant bleeding (see FIG. 2). As shown in FIG. 2, the pigment prepared by the current invention was the only filtrate sample that showed no significant absorption in the visible region. All acidic suspensions containing commercial pigments were red in appearance indicative of the instability of carmine colorants in acidic environments.

sions. The suspensions were mixed, and allowed to settle for about 55 hours. The pigments were then filtered, rinsed with deionized water, and dried at 80° C.

Drawdown preparation and color analysis was performed as described in Example 32. The hiding power index (before and after treatment) and color difference or $\Delta E^*$ between the treated and untreated samples measured against a black and white background is shown in Table 22.

TABLE 20

CIE Lab values measured against a white background using a 10° observer and D65 illuminant with specular component included. Pigment drawdowns (3 mil Bird applicator) were prepared by dispersing 0.5 a pigment in 4.5 g of vehicle (PPG Delstar DMR499 Acrylic Enamel).

|  | Untreated Pigment | | | | | Treated Pigment (pH 1.5, 20 hr) | | | | |
| --- | --- | --- | --- | --- | --- | --- | --- | --- | --- | --- |
| Sample | L* value | a* value | b* value | Chroma | Hue angle | L* value | a* value | b* value | Chroma | Hue angle |
| Example 18 | 61.58 | 29.44 | 14.81 | 32.95 | 26.7 | 63.62 | 29.33 | 17.04 | 33.92 | 30.16 |
| Duocrome ® RY | 70.81 | 20.76 | 9.54 | 22.85 | 24.69 | 76.88 | 11.65 | 14.62 | 18.69 | 51.46 |
| Duocrome ® RO | 67.01 | 28.73 | 4.68 | 29.11 | 9.25 | 75.25 | 15.81 | 12.39 | 20.09 | 38.09 |
| Duocrome ® RV | 63.3 | 33.47 | −13.04 | 35.92 | 338.72 | 71.02 | 21.26 | −2.96 | 21.47 | 352.07 |
| Gemtone ® Ruby | 49.72 | 35.65 | 4.98 | 36 | 7.94 | 51.87 | 33.32 | 7.31 | 34.11 | 12.37 |
| Cloisonne ® Red | 62.18 | 36.82 | −4.23 | 37.06 | 353.45 | 69.17 | 25.95 | 3.89 | 26.24 | 8.52 |
| Cloisonne ® Nu Antique Red | 36.73 | 15 | −6.11 | 16.2 | 337.83 | 39.36 | 13.88 | −4.44 | 14.57 | 342.26 |
| Cosmica ® Red | 42.47 | 47.18 | 2.3 | 47.23 | 2.8 | 55.75 | 38.07 | 0.07 | 38.07 | 0.11 |

Example 34

Alkaline Stability Testing—Green Pearlescent Pigments

Example 27 and three commercially available green mica based pearlescent pigments were tested for alkaline stability. The samples tested and their corresponding components are listed in Table 21.

TABLE 21

Pigment samples tested for alkaline (pH 12.5) stability.

| Sample | Supplier | Product Code | Composition | Particle Size Range (μm) |
| --- | --- | --- | --- | --- |
| Example 27 | Sun Chemical | | Mica, TiO$_2$, Fe$_3$O$_4$ | 10-60 |
| Cloisonné Green | Engelhard | 828C | Mica, TiO$_2$, Cr$_2$O$_3$ | 6-48 |
| Cloisonné Blue Green | Engelhard | 728C | Mica, TiO$_2$, Cr$_2$O$_3$ | 6-48 |
| Cloisonné Nu Antique Green | Engelhard | 828CB | Mica, TiO$_2$, Cr$_2$O$_3$, Iron Oxides | 6-48 |

A basic solution (pH 112.5, NaOH in distilled water) was mixed with 2 wt % pigment (see Table 21) to prepare suspen-

TABLE 22

Hiding power index (HPI) and color difference values ($\Delta E^*$) for green pearlescent pigment samples before and after alkaline treatment (pH 12.5, 55 hours).

|  |  |  | $\Delta E^*$ (Treated vs Untreated) | |
| --- | --- | --- | --- | --- |
| Sample | HPI (Untreated) | HPI (Treated) | White Background | Black Background |
| Example 27 | 0.505 | 0.417 | 2.49 | 1.78 |
| Cloisonné Green | 0.099 | 0.107 | 0.36 | 0.64 |
| Cloisonné Blue Green | 0.099 | 0.087 | 1.64 | 0.69 |
| Cloisonné Nu Antique Green | 1.351 | 0.329 | 16.68 | 14.14 |

Table 21 consists of three types of green pearlescent pigments: Mica-TiO$_2$+Cr$_2$O$_3$ (Cloisonné Green and Blue Green), Mica-TiO$_2$+Cr$_2$O$_3$ mixed with iron oxide particles (Cloisonné Nu Antique Green) and Example 27. A difference between the pigment of Example 27 and the commercially available green pearlescent pigments shown in Table 21 is the absence of Cr$_2$O$_3$. Freedom from chromium containing compounds allows for the use of these green pearlescent pigments in more cosmetic compositions, specifically in applications involving the lip area.

As shown in Table 22, the color stability in alkaline environments of the green pearlescent pigment ($\Delta E^*$=2.49 over a white background and $\Delta E^*$=1.78 over a black background) described in example 27 is consistent with values observed for the blue pearlescent pigment ($\Delta E^*=1.71$ over a white background and $\Delta E^*=1.40$ over a black background) described in examples 23 and 32.

In addition to being chromium-free, the green pearlescent pigments described may be made in both transparent (low HPI) and opaque (high HPI) varieties. $TiO_2$-coated mica pigments containing a layer of $Cr_2O_3$ are generally restricted to transparent pearlescent pigments as depicted in Table 22 (HPI=0.099). On the other hand, Example 27 is much more opaque (HPI=0.505) than both the Cloisonné Green and Blue Green. This is significant when considering that the particle size distribution for Example 27 is slightly higher (see Table 21) than the Cloisonné series pigments. This property allows a more lustrous, green pearlescent pigment with improved hiding power or opacity compared to $Cr_2O_3$ coated mica-based pigments.

In order to improve hiding power or opacity, conventional $Cr_2O_3$ coated mica-based pigments can be combined with loose iron oxide particles to create opaque green pearlescent pigments, such as the technique used to prepare Cloisonné Nu Antique Green (see Table 21). As shown in Table 22, this results in a significant increase in hiding power or surface coverage (HPI=1.351). However, a significant drawback of this approach is the loss of luster due to excess light scattering and the general dirty appearance that results from the presence of these loose nonplatelet-like particles. This approach also results in a significant loss of color stability in liquid preparations (as depicted by the high $\Delta E^*$ shown in Table 22) due to separation of the loose iron oxide particles from the $Cr_2O_3$ coated mica-based pigment.

Example 35

Semi Transparent, Carmine-Free, Red Pearlescent Pigments

Five carmine-free and seven carmine containing red pearlescent pigments were compared, see Table 23. The color of the drawdown of the pigments were red, and had a hue angle from not less than about 275 to not more than about 50 degrees. Drawdown preparation and color analysis was performed as described in example 32. The CIELab color coordinates and the hiding power index for each sample is depicted in Table 24. The pearlescent pigment of example 18 was the only red pearlescent pigment that does not contained carmine with a HPI less than about 1.

TABLE 23

Red Pearlescent Pigments

| Sample | Pigment | Supplier | Contains Carmine |
|---|---|---|---|
| 1 | Example 18 | SunChemical | N |
| 2 | Duocrome ® RY | Engelhard/BASF | Y |
| 3 | Duocrome ® RO | Engelhard/BASF | Y |
| 4 | Duocrome ® RV | Engelhard/BASF | Y |
| 5 | Gemtone ® Ruby | Engelhard/BASF | Y |
| 6 | Cloisonné ® Red | Engelhard/BASF | Y |
| 7 | Cloisonné ® Nu Antique Red | Engelhard/BASF | Y |
| 8 | Cosmica ® Red | Engelhard/BASF | Y |
| 9 | Xirona ® Le Rouge | Merck | N |
| 10 | Sunshine Super Russet | SunChemical | N |
| 11 | SunPearl Maroon | SunChemical | N |
| 12 | SunPearl Bronze | SunChemical | N |

TABLE 24

HPI of Red Pearlescent Pigments

| | | White Background | | | | | Black Background | | | | |
|---|---|---|---|---|---|---|---|---|---|---|---|
| Sample | HPI | L* value | a* value | b* value | Chroma | Hue angle | L* value | a* value | b* value | Chroma | hue angle |
| 1 | 0.063 | 61.58 | 29.44 | 14.81 | 32.95 | 26.7 | 45.8 | 23.5 | −9.39 | 25.31 | 338.22 |
| 2 | 0.159 | 70.81 | 20.76 | 9.54 | 22.85 | 24.69 | 64.52 | 9.67 | 16.08 | 18.76 | 58.99 |
| 3 | 0.098 | 67.01 | 28.73 | 4.68 | 29.11 | 9.25 | 56.84 | 19.45 | 10.75 | 22.23 | 28.93 |
| 4 | 0.060 | 63.3 | 33.47 | −13.04 | 35.92 | 338.72 | 46.73 | 24.7 | −30.39 | 39.17 | 309.11 |
| 5 | 0.254 | 49.72 | 35.65 | 4.98 | 36 | 7.94 | 45.79 | 29.83 | 0 | 29.83 | 360 |
| 6 | 0.077 | 62.18 | 36.82 | −4.23 | 37.06 | 353.45 | 49.2 | 29.66 | −10.24 | 31.38 | 340.96 |
| 7 | 1.111 | 36.73 | 15 | −6.11 | 16.2 | 337.83 | 35.83 | 14.82 | −6.35 | 16.12 | 336.78 |
| 8 | 0.066 | 42.47 | 47.18 | 2.3 | 47.23 | 2.8 | 27.25 | 4.14 | 0.97 | 4.25 | 13.19 |
| 9 | 2.564 | 44.73 | 40.17 | 19.61 | 44.7 | 26.01 | 44.34 | 39.48 | 19.04 | 43.83 | 25.74 |
| 10 | 1.613 | 46.02 | 31.33 | 12.63 | 33.78 | 21.96 | 45.4 | 29.5 | 11.4 | 31.63 | 21.12 |
| 11 | 1.099 | 45.61 | 32.23 | 16.17 | 36.06 | 26.64 | 44.7 | 29.79 | 14.54 | 33.15 | 26.02 |
| 12 | 3.704 | 61.98 | 18.38 | 27.52 | 33.09 | 56.26 | 61.71 | 16.95 | 26.98 | 31.86 | 57.86 |

Example 36

Clear Gel Lip Gloss Preparation

The constituents of the clear gel lip gloss base shown in Table 25 are mixed homogeneously and heated to 80° C. Following sufficient cooling to room temperature, the pigment from Example 8 was added at 2 wt % to the base gel and mixed thoroughly. Similar lip gloss preparations used pigments from Examples 18, 19, 23, 24, 25, 27 and 31.

TABLE 25

Composition of clear gel lip gloss base.

| Ingredients | Weight Fraction (%) |
|---|---|
| Versagel ME750 (Penreco) | 81.5 |
| Ceraphyl 368 (Sblack, ISP) | 10 |
| Ceraphyl 55 (ISP) | 5 |
| Isostearyl Isostearate (Mosselman) | 3 |
| Germaben (Clariant) | 0.5 |

What is claimed is:

1. A pearlescent pigment comprising a substrate and a first layer, wherein the first layer comprises iron oxide, wherein the iron of the iron oxide has from about 1% to about 30%

Fe(II) and from about 70% to about 99% Fe(III), wherein the iron oxide comprises FeOOH.

2. The pearlescent pigment of claim 1, wherein the pigment has an outer protective coating.

3. The pearlescent pigment of claim 2, wherein the pigment has an outer protective coating comprised of an organofunctional coupling reagent wherein the organofunctional coupling reagent is selected from the group consisting of silane, a zirconium aluminate, zirconate, and titanate.

4. The pearlescent pigment of claim 1, further comprising a second layer located between the substrate and the first layer, wherein the second layer having an oxide selected from the group consisting of $TiO_2$, $Fe_2O_3$, $ZrO_2$, $SnO_2$, $Cr_2O_3$, BiOCl, and ZnO.

5. The pearlescent pigment of claim 4, wherein the second layer comprises $TiO_2$.

6. The pearlescent pigment of claim 5, wherein the color of the pigment is blue, with a CIELAB hue angle, $h_{ab}$, from about 170 to about 275 degrees, measured over a white background.

7. The pearlescent pigment of claim 6, wherein the pigment has a $\Delta E^*$ of less than about 2, when measured for alkaline stability.

8. The pearlescent pigment of claim 5, wherein the pigment has a green color with a CIELAB hue angle, $h_{ab}$, from about 80 to about 170 degrees, measured over a white background.

9. The pearlescent pigment of claim 8, wherein the pigment does not contain $Cr_2O_3$.

10. The pearlescent pigment of claim 5, wherein the pigment had a red, violet, or pink color with a CIELAB hue angle, $h_{ab}$, from not less than about 275 to not more than about 50 degrees, measured over a white background.

11. The pearlescent pigment of claim 10, wherein the pigment does not contain carmine.

12. The pearlescent pigment of claim 11, wherein the pigment has a HPI of less than about 1.

13. The pearlescent pigment of claim 6, wherein the pigment has a CIELab $L^*$ value of about 30 or less and a chroma value of about 3 or less.

14. The pearlescent pigment of claim 4, wherein the second layer comprises $Fe_2O_3$.

15. The pearlescent pigment of claim 4, wherein the mean thickness of the second layer is about 50 nm to about 800 nm.

16. The pearlescent pigment of claim 4, wherein the mean thickness of the second layer is about 100 nm to about 600 nm.

17. The pearlescent pigment of claim 1, wherein the substrate is a mixture of different substrates and made of identical or different flakes which differ in particle size.

18. The pearlescent pigment of claim 1, wherein the substrate is selected from the group consisting of natural mica, synthetic mica, glass flakes, $Al_2O_3$ platelets, $SiO_2$ platelets, and BiOCl.

19. The pearlescent pigment of claim 18, wherein the substrate comprises natural mica.

20. The pearlescent pigment of claim 18, wherein the substrate comprises synthetic mica.

21. The pearlescent pigment of claim 1, wherein the substrate has a mean thickness of about 0.05 to about 1.5 μm, a mean width of about 1 to about 750 μm.

22. The pearlescent pigment of claim 1, wherein the substrate has a mean thickness of about 0.05 to about 1.5 μm, a mean width of about 10 to about 60 μm.

23. The pearlescent pigment of claim 1, wherein the iron of the iron oxide in the first layer has from about 12% to about 18% Fe(II) and from about 82% to about 88% Fe(III).

24. The pearlescent pigment of claim 1, wherein the iron of the iron oxide in the first layer has from about 14% to about 16% Fe(II) and from about 84% to about 86% Fe(III).

25. The pearlescent pigment of claim 1, wherein the iron of the iron oxide, is about 1% to about 15% of the weight of the pigment.

26. The pearlescent pigment of claim 1, wherein the mean thickness of the first layer is about 1 nm to about 350 nm.

27. The pearlescent pigment of claim 1, wherein the mean thickness of the first layer is about 10 nm to about 350 nm.

28. A cosmetic composition comprising the pigment of claim 1.

29. A paint or ink composition comprising the pigment of claim 1.

30. A plastic composition comprising the pigment of claim 1.

31. The pigment of claim 1, wherein the pigment is included in a composition for cosmetic applications, printing inks, paints, surface coatings, plastics, glasses, ceramic materials, coatings for laser marking, pigment preparations, dry preparations, or textile printing.

32. The pigment of claim 1, wherein the first layer has an innermost part, the innermost part of the first layer comprises FeOOH.

33. A pearlescent pigment prepared by the steps of:
coating a substrate with a metal oxide thereby forming a first layer, reducing the metal oxide of the first layer, wherein only about 1% to about 30% of the metal is reduced, wherein the metal oxide comprises FeOOH.

34. The pearlescent pigment of claim 33, wherein the substrate is selected from the group consisting of natural mica, synthetic mica, glass flakes, $Al_2O_3$ platelets, $SiO_2$ platelets, and BiOCl.

35. The pearlescent pigment of claim 34, wherein the pearlescent pigment further comprises a second layer located between the substrate and the first layer, wherein the second layer comprises an oxide selected from the group consisting of $TiO_2$, $Fe_2O_3$, $ZrO_2$, $SnO_2$, $Cr_2O_3$, BiOCl, and ZnO.

36. A pearlescent pigment prepared by the process of claim 33.

37. The pigment of claim 28, wherein the first layer has an innermost part, the innermost part of the first layer comprises FeOOH.

* * * * *